US012542207B2

(12) United States Patent
Weldy et al.

(10) Patent No.: US 12,542,207 B2
(45) Date of Patent: Feb. 3, 2026

(54) COMPUTING TECHNOLOGIES FOR OPERATING USER INTERFACES BASED ON INTEGRATING DATA FROM DATA SOURCES

(71) Applicant: OSF Healthcare System, Peoria, IL (US)

(72) Inventors: James Weldy, Peoria, IL (US); Jill Teubel, Washington, IL (US); Mary Marvin, Washington, IL (US)

(73) Assignee: OSF Healthcare System, Peoria, IL (US)

( * ) Notice: Subject to any disclaimer, the term of this patent is extended or adjusted under 35 U.S.C. 154(b) by 0 days.

(21) Appl. No.: 18/994,487

(22) PCT Filed: Jul. 20, 2023

(86) PCT No.: PCT/US2023/028289
§ 371 (c)(1),
(2) Date: Jan. 14, 2025

(87) PCT Pub. No.: WO2024/020165
PCT Pub. Date: Jan. 25, 2024

(65) Prior Publication Data
US 2025/0266157 A1  Aug. 21, 2025

Related U.S. Application Data

(60) Provisional application No. 63/391,629, filed on Jul. 22, 2022.

(51) Int. Cl.
*G16H 40/20* (2018.01)
*G06F 21/62* (2013.01)
*G16H 10/60* (2018.01)

(52) U.S. Cl.
CPC ......... *G16H 40/20* (2018.01); *G06F 21/6263* (2013.01); *G16H 10/60* (2018.01)

(58) Field of Classification Search
CPC ..... G16H 40/20; G16H 10/60; G06F 21/6263
See application file for complete search history.

(56) References Cited

U.S. PATENT DOCUMENTS

2002/0138155 A1  9/2002  Bristol
2005/0010093 A1  1/2005  Ford
(Continued)

FOREIGN PATENT DOCUMENTS

WO  WO-9706499 A1 *  2/1997  ............. G16H 40/67
WO  WO-2019229528 A2 *  12/2019  ............. G16H 50/70

OTHER PUBLICATIONS

International Search Report and Written Opinion dated Oct. 19, 2023 in related PCT Application PCT/US23/28289 filed Jul. 20, 2023 (8 pages).
(Continued)

*Primary Examiner* — Fonya M Long
*Assistant Examiner* — Anthony Balaj
(74) *Attorney, Agent, or Firm* — Dentons US LLP

(57) ABSTRACT

This disclosure enables a cloud computing instance containing a first program and a first relational database managed by the first program. The first relational database stores a set of data for an implantable medical device containing an identifier of the implantable medical device, an instruction on use of the implantable medical device associated with the identifier, and a set of contact information for the implantable medical device associated with the identifier. The cloud computing instance further includes an object storage storing a set of artifacts sourced from the set of data for the implantable medical device containing the identifier of the implantable medical device, the instruction on use of the
(Continued)

implantable medical device associated with the identifier, and the set of contact information for the implantable medical device associated with the identifier; and a logical unit containing a second program and a second relational database managed by the second program.

20 Claims, 15 Drawing Sheets

(56) References Cited

U.S. PATENT DOCUMENTS

| | | | |
|---|---|---|---|
| 2006/0004588 A1* | 1/2006 | Ananda | G06Q 10/00 |
| | | | 705/67 |
| 2006/0026035 A1* | 2/2006 | Younkes | G16H 50/70 |
| | | | 703/11 |
| 2011/0295078 A1 | 12/2011 | Reid | |
| 2013/0045764 A1* | 2/2013 | Vik | H04L 67/12 |
| | | | 455/500 |
| 2014/0067406 A1 | 3/2014 | Hyatt | |
| 2014/0107509 A1 | 4/2014 | Banet | |
| 2016/0294951 A1* | 10/2016 | Durrant | H04L 41/22 |
| 2017/0196457 A1 | 7/2017 | Thakur | |
| 2017/0243028 A1 | 8/2017 | LaFever | |
| 2019/0378623 A1* | 12/2019 | Hansen | G16H 80/00 |
| 2021/0092159 A1* | 3/2021 | Crabtree | G06F 16/951 |
| 2021/0280317 A1* | 9/2021 | Jackson | G16H 10/60 |
| 2021/0313076 A1* | 10/2021 | Jho | G16H 40/67 |
| 2021/0407664 A1 | 12/2021 | Greene | |
| 2022/0168065 A1* | 6/2022 | McNutt | G06K 7/1413 |
| 2022/0208323 A1 | 6/2022 | Nelson | |

OTHER PUBLICATIONS

Australian Examination Report dated Jan. 30, 2025 in related patent application 2023308946 (4 pages).

Australian Examination Report dated May 9, 2025 in related application 2023308946 (3 pages).

Europe Search Report dated Sep. 23, 2025 in related application 23843703.2 filed Jul. 20, 2023 (12 pages).

\* cited by examiner

COMPUTING TECHNOLOGIES FOR OPERATING USER INTERFACES BASED ON INTEGRATING DATA FROM DATA SOURCES

CROSS-REFERENCE TO RELATED PATENT APPLICATIONS

This patent application claims a benefit of priority to PCT International Application PCT/US23/28289 filed 20 Jul. 2023; which claims a benefit of priority to U.S. provisional patent application 63/391,629 filed 22 Jul. 2022; each of which is incorporated by reference herein in its entirety for all purposes.

TECHNICAL FIELD

This disclosure relates to various computing technologies for operating user interfaces based on integrating data from various data sources.

BACKGROUND

A manufacturer may manufacture an implantable medical device (e.g., an active implantable medical device, a passive implantable device, a nerve stimulator, a pacemaker, a pump, a stent) for implantation into, removal from, or maintenance within a patient at a medical facility (e.g., a hospital, an operating center) by a medical practitioner (e.g., a doctor, a nurse) during a medical procedure (e.g., a surgery). Since the implantable medical device may be complex to implant, remove, or maintain, the manufacturer may provide the medical practitioner with an instruction for use (IFU) (e.g., a nursing instruction), which may be embodied as a physical item (e.g., a booklet) or an electronic item (e.g., a data file). As such, the medical practitioner may consume the IFU for guidance on how to implant, remove, or maintain the implantable medical device, which may occur before, during, or after the implantable medical device is being implanted, removed, or maintained during the medical procedure at the medical facility. Since the implantable medical device may include hardware and software, the implantable medical device may have various models, hardware versions, and software versions for which the IFU needs be medically informative, current in content, and technologically accurate, while accounting for potential side-effects from current or new medical treatments (e.g., medical compositions of matter) and introductions of new medical technology (e.g., medical devices).

Since there are many medical facilities, medical practitioners, medical procedures, and many manufacturers manufacturing many implantable medical devices with many models, hardware versions, and software versions, there is a desire for a medical facility information system (e.g., a hospital information system (HIS)) to be able to readily provide information sourced (e.g., extracted, inferred, copied) from various IFUs corresponding to such multitude of possibilities on-demand, when requested by the medical practitioners. However, there is no known medical facility information system that is able to do so for various reasons. First, this amount of information is not standardized, not available on-demand, not centralized, and not current. Second, there is no known medical facility information system that is architected to store, update, and disseminate this amount of information on-demand in a manner that is conducive to the medical practitioners on-demand, when the implantable medical devices are being implanted, removed, or maintained during the medical procedures at the medical facilities, while being available to the manufacturers without revealing patient identifying information. Third, the manufacturers may not be incentivized to disseminate this amount of information, because providing the various IFUs to third party data stores (e.g., medical facility information systems) is significantly more logistically and computationally burdensome and laborious than providing such information to a single data store from which the third party data stores can then source such amount of information.

SUMMARY

This disclosure solves various technological problems noted above by providing improvements to computer functionality via enabling various computing technologies for operating user interfaces based on integrating data (e.g., various IFUs, information sourced (e.g., extracted, inferred, copied) from various IFUs) from various data sources (e.g., servers, server farms, web servers, application servers, database servers, computing clouds, application programming interfaces). As such, since there are many medical facilities, medical practitioners, medical procedures, and many manufacturers manufacturing many implantable medical devices (e.g., an active implantable medical device, a passive implantable device, a nerve stimulator, a pacemaker, a pump, a stent) with many models, hardware versions, and software (e.g., firmware, application software, system software, microcode, source code, object code) versions, a medical facility information system (e.g., an HIS) is enabled to readily provide various IFUs corresponding to such multitude of possibilities on-demand, when requested by various medical practitioners, while also enabling related communications.

In an embodiment, there may be a system comprising: a cloud computing instance containing: a first program; a first relational database managed by the first program, wherein the first relational database stores a set of data for an implantable medical device containing (i) an identifier of the implantable medical device, (ii) an instruction on use of the implantable medical device associated with the identifier, and (iii) a set of contact information for the implantable medical device associated with the identifier, wherein the first program is accessible by a manufacturer user profile from a manufacturer computing terminal; an object storage storing a set of artifacts sourced from the set of data for the implantable medical device containing (i) the identifier of the implantable medical device, (ii) the instruction on use of the implantable medical device associated with the identifier, and (iii) the set of contact information for the implantable medical device associated with the identifier; and a logical unit containing a second program and a second relational database managed by the second program, wherein the second relational database stores (i) a set of patient specific data for a medical procedure related to the identifier, (ii) a copy of the artifact of the set of artifacts containing the instruction on use of the implantable medical device associated with the identifier, and (iii) a copy of the artifact of the set of artifacts containing the set of contact information for the implantable medical device associated with the identifier, wherein the object storage is logically interposed between the first program and the second program, wherein the second program is accessible by a medical user profile from a medical computing terminal and a patient user profile from a patient computing terminal, wherein the patient user profile contains a set of personally identifiable information, wherein the second program is programmed to present a user interface to the medical user profile associated with the logical unit, wherein the user interface contains a first screen and a second screen, wherein the first screen contains a set of columns presented side-by-side distributively depicting a set of content populated from (i) the set of patient specific data for the medical procedure related to the identifier, (ii) the copy of the artifact of the set of artifacts containing the instruction on use of the implantable medical device associated with the identifier, and (iii) the copy of the artifact of the set of artifacts containing the set of contact information for the implantable medical device associated with the identifier, wherein (i) the copy of the artifact of the set of artifacts containing the instruction on use of the implantable medical device associated with the identifier and (ii) the copy of the artifact of the set of artifacts containing the set of contact information for the implantable medical device associated with the identifier are editable from the medical user profile, wherein the second screen presents a chat area for entry of a chat text associated with (i) the identifier, (ii) the set of patient specific data for the medical procedure related to the identifier, (iii) the copy of the artifact of the set of artifacts containing the instruction on use of the implantable medical device associated with the identifier, and (iv) the copy of the artifact of the set of artifacts containing the set of contact information for the implantable medical device associated with the identifier, wherein the first screen is navigable to the second screen or vice versa, wherein the chat text is presented to the manufacturer user profile, the medical user profile, or the patient user profile such that the manufacturer user profile does not access the set of personally identifiable information.

DETAILED DESCRIPTION

Figure 1:
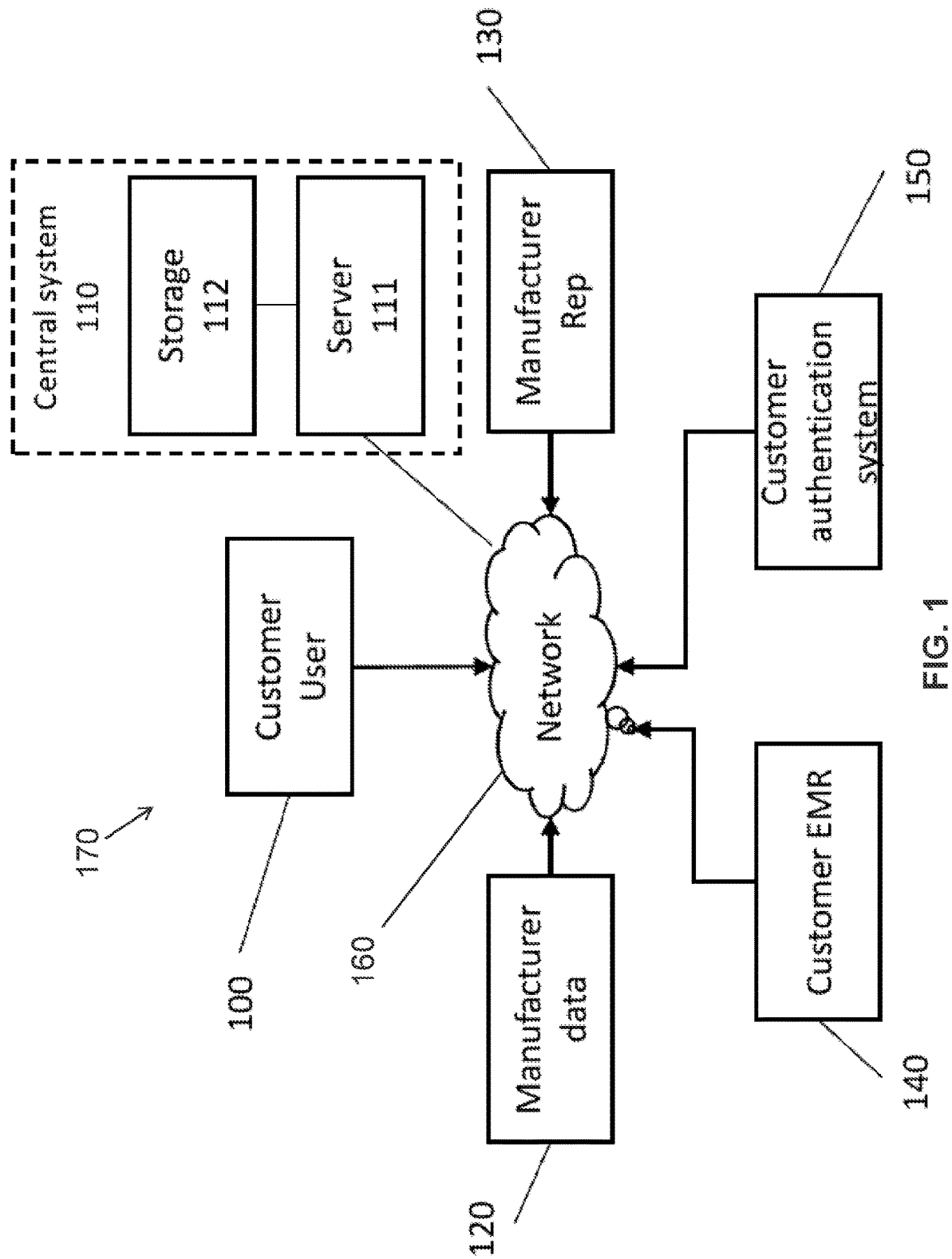
FIG. 1 shows a diagram of an embodiment of a hardware architecture according to this disclosure.

As explained above, this disclosure solves various technological problems noted above by providing improvements to computer functionality via enabling various computing technologies for operating user interfaces based on integrating data (e.g., various IFUs, information sourced (e.g., extracted, inferred, copied) from various IFUs) from various data sources (e.g., servers, server farms, web servers, application servers, database servers, computing clouds, application programming interfaces). As such, since there are many medical facilities, medical practitioners, medical procedures, and many manufacturers manufacturing many implantable medical devices (e.g., an active implantable medical device, a passive implantable device, a nerve stimulator, a pacemaker, a pump, a stent) with many models, hardware versions, and software (e.g., firmware, application software, system software, microcode, source code, object code) versions, a medical facility information system (e.g., an HIS) is enabled to readily provide various IFUs corresponding to such multitude of possibilities on-demand, when requested by various medical practitioners, while also enabling related communications.

This disclosure is now described more fully with reference to all attached figures, in which some embodiments of this disclosure are shown. This disclosure may, however, be embodied in many different forms and should not be construed as necessarily being limited to various embodiments disclosed herein. Rather, these embodiments are provided so that this disclosure is thorough and complete, and fully conveys various concepts of this disclosure to skilled artisans. Note that like numbers or similar numbering schemes can refer to like or similar elements throughout.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

As used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of the foregoing instances. For example, X includes A or B can mean X can include A, X can include B, and X can include A and B, unless specified otherwise or clear from context.

As used herein, each of singular terms "a," "an," and "the" is intended to include a plural form (e.g., two, three, four, five, six, seven, eight, nine, ten, tens, hundreds, thousands, millions) as well, including intermediate whole or decimal forms (e.g., 0.0, 0.00, 0.000), unless context clearly indicates otherwise. Likewise, each of singular terms "a," "an," and "the" shall mean "one or more," even though a phrase "one or more" may also be used herein.

As used herein, each of terms "comprises," "includes," or "comprising," "including" specify a presence of stated features, integers, steps, operations, elements, or components, but do not preclude a presence or addition of one or more other features, integers, steps, operations, elements, components, or groups thereof.

As used herein, when this disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, terms, such as "then," "next," or other similar forms are not intended to limit an order of steps. Rather, these terms are simply used to guide a reader through this disclosure. Although process flow diagrams may describe some operations as a sequential process, many of those operations can be performed in parallel or concurrently. In addition, the order of operations may be re-arranged.

As used herein, a term "response" or "responsive" are intended to include a machine-sourced action or inaction, such as an input (e.g., local, remote), or a user-sourced action or inaction, such as an input (e.g., via user input device).

As used herein, a term "about" or "substantially" refers to a +/−10% variation from a nominal value/term.

Although various terms, such as first, second, third, and so forth can be used herein to describe various elements, components, regions, layers, or sections, note that these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section, without departing from this disclosure.

Unless otherwise defined, all terms (including technical and scientific terms) used herein have a same meaning as commonly understood by skilled artisans to which this disclosure belongs. These terms, such as those defined in commonly used dictionaries, should be interpreted as having a meaning that is consistent with their meaning in context of relevant art and should not be interpreted in an idealized or overly formal sense, unless expressly so defined herein.

Features or functionality described with respect to certain embodiments may be combined and sub-combined in or with various other embodiments. Also, different aspects, components, or elements of embodiments, as disclosed herein, may be combined and sub-combined in a similar manner as well. Further, some embodiments, whether individually or collectively, may be components of a larger system, wherein other procedures may take precedence over or otherwise modify their application. Additionally, a number of steps may be required before, after, or concurrently with embodiments, as disclosed herein. Note that any or all methods or processes, as disclosed herein, can be at least partially performed via at least one entity or actor in any manner.

Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of an embodiment of a hardware architecture according to this disclosure. In particular, there is a hardware architecture 170 that brings together important information about implantable medical devices and enables individuals (by user profiles) involved in various processes of performing medical procedures on patients potentially having those implanted devices, to view that information and electronically communicate with one another regarding those medical procedure cases, as disclosed herein. As such, the hardware architecture 170 contains a customer (e.g., a member of a hospital staff) user computing terminal 100 (e.g., a desktop computer, a laptop computer, a tablet computer), a central computing system 110 (e.g., a cloud computing instance), a manufacturer data store 120 (e.g., a database), a manufacturer representative computing terminal 130 (e.g., a desktop computer, a laptop computer, a tablet computer), a customer (e.g., an HIS) electronic medical record (EMR) data store 140 (e.g., a database, a relational database, a graph database, an in-memory database), a customer authentication system 150 (e.g., an authentication server), and a network 160 (e.g., a wide area network (WAN), a local area network (LAN)). The central computing system 110 includes a server 111 (e.g., a physical server, a virtual server, a web server, an application server, a database server) and a storage 112 (e.g., a database, a relational database, a graph database, an in-memory database). The manufacturer data store 120 may source a set of IFUs for a set of implantable medical devices and a set of contact information for a manufacturer representative supporting the set of implantable medical devices and associated with the manufacturer representative computing terminal 130. The customer EMR data store 140 includes a database record with a set of fields populated with a set of medical data for a user operating the customer user computing terminal 100 accessing the central computing system 110 via the customer authentication system 150. The server 111 periodically sources the set of IFUs from the manufacturer data store 120 and stores the set of IFUs in the storage for access, as disclosed herein. For security purposes, the storage 112 is isolated from the network 160 but each of the customer user computing terminal 100, the server 111, the manufacturer data store 120, the manufacturer representative computing terminal 130, the customer EMR data store 140, and the customer authentication system 150 are in communication with the network 160, to enable various functionality, as disclosed herein.

The hardware architecture 170 allows the manufacturer data store 120 to periodically (e.g., at a preset time interval) source (e.g., push) data (e.g., IFUs) to be ingested into the server 110. For example, such data can contain a data file (e.g., a read-only file, a portable document format (PDF) file, a hypertext markup language (HTML) file) containing an IFU (e.g., a descriptive human-readable text, an image content, a sound content) for a medical implantable device (e.g., a pacemaker, a stent). For example, such data can contain a set of contact information (e.g., a phone number, an email address, a social media networking service profile identifier, a chat name identifier) for a representative of a manufacturer of the medical implantable device operating the manufacturer representative computing terminal 130, who may be involved in supporting the medical implantable device when the medical implantable device is implanted, replaced, or maintained by a medical practitioner (e.g., a doctor, a nurse) at a medical facility (e.g., a hospital, an operating center). This data may be transformed (e.g., formatted, edited, merged), as disclosed herein. Some data from the customer EMR data store 140 may be transformed by the server 111 and populated into the storage 112. For example, some data from the customer EMR data store 140 can contain a database record with a set of fields populated with a set of medical data for a user operating the customer user computing terminal 100 accessing the central computing system 110 via the customer authentication system 150 and that data may be transformed by the server 111 and populated into the storage 112. The manufacturer representative computing terminal 130 may access (e.g., login) the central computing system 110 to remotely view and remotely edit information regarding upcoming medical procedure cases, which may be respectfully relevant thereto, as disclosed herein.

Figure 2:
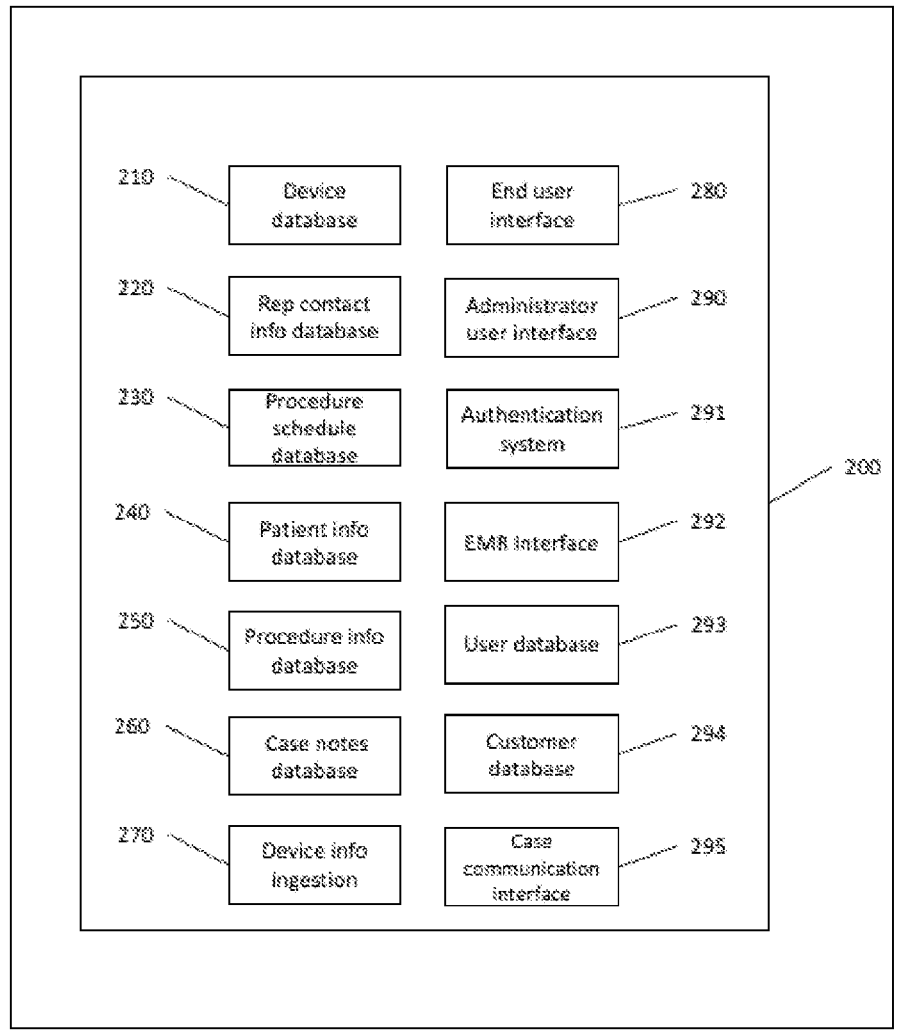
FIG. 2 shows a diagram of an embodiment of a software architecture according to this disclosure.

FIG. 2 shows a diagram of an embodiment of a software architecture according to this disclosure. In particular, there is a software architecture 200 running on the hardware architecture 170. For example, the software architecture 200 may be implemented on the central computing system 110. The software architecture 200 contains a device database 210, a representative contact information database 220, a procedure schedule database 230, a patient information database 240, a procedure information database 250, a case notes database 260, a device information ingestion module 270, an end user interface 280, an administrator user interface 290, an authentication system 291, an EMR interface 292, a user database 293, a customer database 294, and a case communication database 295. Each of the device database 210, the representative contact information database 220, the procedure schedule database 230, the patient information database 240, the procedure information database 250, the case notes database 260, the user database 293, the customer database 294, and the case communication database 295 has a corresponding primary key based on which queries for data can be made. For example, the device database 210 has a device primary key, the representative contact information database 220 has a representative primary key, the procedure schedule database 230 has a procedure event primary key, the patient information database 240 has a patient primary key, the procedure information database 250 has a procedure type primary key, the case notes database 260 has a case primary key, and so forth.

There may be the network 160 over which the central computing system 110 enables communication to/from the various software applications and processes being executed by the software architecture 200 (e.g., a chat system, a chatbot system, a set of database queries) between a first computing terminal (e.g., a desktop computer, a laptop computer) and a second computing terminal (e.g., a desktop computer, a laptop computer), where the first computing terminal or the second computing terminal can include the customer user computing terminal 100, the manufacturer data store 120, the manufacturer representative computing terminal 130, the customer EMR data store 140, or the customer authentication system 150. Each of the central computing system 110, the first computing terminal, and the second computing terminal is in communication (e.g., wired, wireless, waveguide) with the network 160. The network is a WAN, a LAN, a cellular network, a satellite network, or any other suitable network, which can include Internet. Although the network can be a single network, this is not required and the network can be a group or collection of suitable networks collectively operating together in concert to accomplish various functionality, as disclosed herein.

The device database 210 is a database (e.g., a relational database, a graph database, an in-memory database) having a set of records, each having a set of fields, collectively and correspondingly storing a set of technical information for operation (e.g., precautionary measures, safety procedures, maintenance, installation, uninstallation) of a set of implantable medical devices (e.g., an active implantable medical device, a passive implantable medica device, a pacemaker, a nerve stimulator, a pump, a stent) that is indexed for fast retrieval. Examples of data stored in this database for each implantable medical device include a manufacturer identifier, a product identifier, a product version identifier, a hardware version identifier, a software (e.g., firmware, application software, system software, microcode, source code, object code) version identifier, a serial number, a date of manufacture, a location of manufacture, a set of instructions for use (e.g., text, images, videos, sounds), which may include a set of precautional content (e.g., a collection of text, images, videos, sounds for an electrocautery procedure, a collection of text, images, videos, sounds for a magnetic resonance imaging (MRI) procedure), and other suitable relevant data for operation (e.g., installation, uninstallation, maintenance) of that implantable medical device. Each record in the set of records of the implantable medical device database 210 may have a primary key, which may be the product identifier or the serial number, by which that respective record may be accessed to be modified or retrieved.

The representative contact information database 220 is a database (e.g., a relational database, a graph database, an in-memory database) having a set of records, each having a set of fields, collectively and correspondingly storing a set of contact information for a set of representatives of a set of manufacturers of the set of implantable medical devices. For example, the set of contact information may include a relevant primary key sourced from the set of records of the device database 210, a location identifier, a unique representative identifier, a first name, a last name, a physical address, an email address, a phone number, a social media networking service identifier, or any other relevant suitable piece of contact information. For example, each record in the set of records of the representative contact information database 220 may have a primary key, which may be the unique representative identifier, by which that respective record may be accessed to be modified or retrieved. As such, the set of records in the representative contact information database 220 may be queried based on or after the set of records in the device database 210 is queried so that relevant contact information from the set of records in the representative contact information database 220 is requested to be retrieved depending on what record in the set of records of the device database 210 is requested to be retrieved and based on a location identifier (e.g., a network address, a computing device identifier, a zip code, a town identifier, a state identifier, a city identifier, a country identifier, a facility identifier) of a facility in which that query is made or sourced from. For example, if a record for an implantable medical device A is requested to be retrieved from the device database 210 and that query is for a facility in a given location B, then a record for a set of contact information corresponding to the implantable medical device A and that location B is retrieved from the representative contact information database 220 to be aggregated for use (e.g., display), as disclosed herein, although this dependency or order may be reversed by which a record for a set of contact information from the representative contact information database 220 may be requested to be retrieved and then a record for an implantable medical device from the device database 210 may be correspondingly requested to be retrieved, which may be based on the primary key in the record for the set of contact information matching the primary key in the record for the implantable medical device. Note that the set of contact information for the set of representatives is localized or contains localization data, allowing that data to be logically tied on a medical facility level, as disclosed herein. As such, this modality of localization accounts for geographic locale, technical expertise, language of communication, time zones, and other suitable and relevant localization factors. Therefore, the set of contact information for the set of representatives may differ for different medical facilities, depending on geographic locale, technical expertise, language of communication, time zones, and other suitable and relevant localization factors.

The procedure schedule database 230 (e.g., a relational database, a graph database, an in-memory database) contains a set of identifying information regarding scheduling of each medical procedure, i.e., a patient (e.g., identifier), a medical procedure type (e.g., identifier), a medical procedure format (e.g., identifier), a medical facility (e.g., identifier), a medical procedure room (e.g., identifier), a medical practitioner (e.g., doctor identifier, nurse identifier), an implantable medical device (e.g., a primary key sourced from a relevant record of the implantable medical device database 210), a responsible representative (e.g., a primary key sourced from a relevant record of the representative contact information database 220), a date for medical procedure, a time for medical procedure, and other suitable and relevant data required to identify scheduling of medical procedure cases. Therefore, the procedure schedule database 230 may have a set of records, each having a set of fields, collectively and correspondingly storing a set of identifying information for scheduling the set of medical procedures involving the set of implantable medical devices (e.g., installation, uninstallation, maintenance). For example, the set of identifying information may include a relevant primary key sourced from the set of records of the device database 210, a relevant primary key sourced from the set of records of the representative contact information database 220, a unique medical procedure event slot identifier, or any other relevant suitable piece of identifying scheduling of medical procedures. For example, each record in the set of records of the procedure schedule database 220 may have a primary key, which may be the unique medical procedure event slot identifier, by which that respective record may be accessed to be modified or retrieved.

The patient information database 240 (e.g., a relational database, a graph database, an in-memory database) contains a set of identifying information about each patient, i.e., a patient name, an age, a gender, a unique patient identifier, and other which is relevant to managing medical procedure cases. Therefore, the patient information database 240 may have a set of records, each having a set of fields, collectively and correspondingly storing a set of identifying information for each patient associated with the set of medical procedures involving the set of implantable medical devices (e.g., installation, uninstallation, maintenance). For example, the set of identifying information for each patient may include a relevant primary key sourced from the set of records of the device database 210, a relevant primary key sourced from the set of records of the representative contact information database 220, a unique medical procedure event slot identifier, a unique patient identifier, or any other relevant suitable piece of identifying patients associated with medical procedures. For example, each record in the set of records of the patient information database 240 may have a primary key, which may be the unique patient identifier, by which that respective record may be accessed to be modified or retrieved.

The procedure information database 250 (e.g., a relational database, a graph database, an in-memory database) contains identifying information about medical procedures with relevant information regarding IFUs for relevant procedure types, which includes information common to the device database 210. For example, the procedure information database 250 may have a record containing a field or a set of fields containing information (e.g., a data file, a PDF file, a JSON file, a structured text, an unstructured text, a descriptive text, a human-readable text, an image, a photo, a video, a diagram, a schematic diagram, a sound) indicating that laparoscopic surgery usually involves electrocautery, or cystourethroscopy may involve lithotripsy, so those precautions or relevant IFUs or information sourced (e.g., extracted, inferred, copied) from relevant IFUs should be reviewed by a user profile (e.g., a doctor, a nurse). Therefore, the procedure information database 250 may have a set of records, each having a set of fields, collectively and correspondingly storing the set of information about medical procedures and relevant information regarding IFUs for relevant procedure types. For example, the set of information about medical procedures and relevant information regarding IFUs for relevant procedure types may include a relevant primary key sourced from the set of records of the device database 210, a relevant primary key sourced from the set of records of the representative contact information database 220, a unique medical procedure event slot identifier sourced from the set of records of the procedure schedule database 230, and a unique patient identifier sourced from the set of records of the patient information database 240. For example, each record in the set of records of the procedure information database 250 may have a primary key, which may be a unique procedure identifier, by which that respective record may be accessed to be modified or retrieved.

The case notes database 260 (e.g., a relational database, a graph database, an in-memory database) contains identifying information relevant to each medical procedure case, i.e., a status of patient interview, a logistics with a representative identified in the representative contact information database 220, a device information notes, or any other electronic communications relevant to that respective procedure case, and especially those which are not captured in the EMR data store 140. Therefore, the case notes database 260 may have a set of records, each having a set of fields, collectively and correspondingly storing the set of information about each medical procedure case. For example, the set of information about medical procedure case may include a relevant primary key sourced from the set of records of the device database 210, a relevant primary key sourced from the set of records of the representative contact information database 220, a unique medical procedure event slot identifier sourced from the set of records of the procedure schedule database 230, a unique patient identifier sourced from the set of records of the patient information database 240, and a unique procedure identifier sourced from the set of records of the procedure information database 250. For example, each record in the set of records of the procedure information database 250 may have a primary key, which may be a unique procedure identifier, by which that respective record may be accessed to be modified or retrieved. Note that at least some metadata, such as a user identifier and a timestamp, for each note may also captured, whether for creating new note or editing new note. Such metadata may enable various user operations disclosed herein.

The device information ingestion module 270 (e.g., an executable logic dedicated to performance of a single task, an application program, a function, a subroutine) comprises two logical components—a manual interface to manually enter (e.g., via a physical or virtual keyboard) relevant information (e.g., data files with IFUs) and an automated interface which allows for an automated acquisition of relevant information (e.g., data files with IFUs) from data sources (e.g., servers, server farms, web servers, application servers, database servers, computing clouds, application programming interfaces) controlled by the manufacturers of the implantable medical devices and remote from the device information ingestion module 270. The device information ingestion module 270 transforms (e.g., identifies, extracts, copies, edits, formats) acquired data (e.g., data files with IFUs) into a format (e.g., a JavaScript Object Notation (JSON) format) appropriate for the implantable medical device database 210, as disclosed herein. The device information ingestion module 270 can be operative for manual (e.g., per user request) or automatic (e.g., scheduled, conditioned, semaphored) operation, depending on its acquisition method.

The end user interface 280 is an executable logic (e.g., an application program) enabling various digital screens, whether displayed in a viewport of an application program, a web browser application program, a mobile application program, or other suitable software, which enable an end user (e.g., via a profile accessed by a desktop computer, a laptop computer, a smartphone, a tablet computer) from a provider side (e.g., a medical practitioner) to access relevant implantable medical device information (e.g., various IFUs or information sourced (e.g., extracted, inferred, copied) from various IFUs) or representative information (e.g., contact information), depending on permissioning via authorization of those user profiles as disclosed herein. The end user interface 280 is enabled to access data sourced from the various databases shown in FIG. 2 or other data from various interfaces shown in FIG. 2. Therefore, the end user can log in and out through the end user interface 280, as permissioned. Some specific users may be permissioned or authorized to edit certain types of data (e.g., an editor mode), or may only be authorized to view data (e.g., a reader mode).

The administrator interface 290 is an executable logic (e.g., an application program) and corresponding user interface intended for use by a superuser (e.g., via a profile accessed by a desktop computer, a laptop computer, a smartphone, a tablet computer) in order to perform various administrative tasks for the software architecture 200.

The authentication system 291 (e.g., an application program, a software module, an application programming interface) allows users (e.g., via a profile accessed by a desktop computer, a laptop computer, a smartphone, a tablet computer) at a customer facility to authenticate using their own authentication service, such as Active Directory. This is sometimes referred to as an SSO or a "single sign on."

The EMR interface 292 is an application programming interface capable of multiple or parallel computing operations by having an inbound schedule interface, an inbound patient interface, and an outbound schedule interface. The inbound schedule interface can pull (e.g., download) surgery/procedure schedule information data from an EMR source (e.g., a remote server). This surgery/procedure schedule information data is acquired and stored, which may be cached and periodically reached, to provide quick access to end users (operating computing terminals disclosed herein) to information regarding patients with upcoming procedures. The inbound patient interface can receive relevant patient information from an EMR source (e.g., a remote server) to look up information about any medical devices known to be implanted in patients scheduled for surgery, or any other relevant patient information. The outbound patient interface can feed information back to the EMR interface 292 regarding any medical devices being implanted in a current procedure.

The user database 293 (e.g., a relational database, a graph database, an in-memory database) contains identifying information required to authenticate users and authorize those users to perform various functions and/or access certain types of data disclosed herein. Therefore, the user database 293 may have a set of records, each having a set of fields, collectively and correspondingly storing the set of information required to authenticate users and authorize those users to perform various functions and/or access certain types of data disclosed herein. For example, each record in the set of records of the user database 293 may have a primary key, which may be a unique user identifier, by which that respective record may be accessed to be modified or retrieved.

The customer database 294 (e.g., a relational database, a graph database, an in-memory database) stores identifying data about customers, including user information, geography, and facility granularity, disclosed herein. Therefore, the customer database 294 may have a set of records, each having a set of fields, collectively and correspondingly storing the set of information identifying data about customers, including user information, geography, and facility granularity. For example, each record in the set of records of the customer database 294 may have a primary key, which may be a unique user identifier, by which that respective record may be accessed to be modified or retrieved.

The case communication interface 295 provides an executable logic (e.g., an application program, a function) for text, imagery, sound or other information regarding a surgery/procedure case to be transmitted and viewed, as disclosed herein. Multi-modal notifications may optionally be sent to relevant parties as information on the case changes.

Figure 3A:
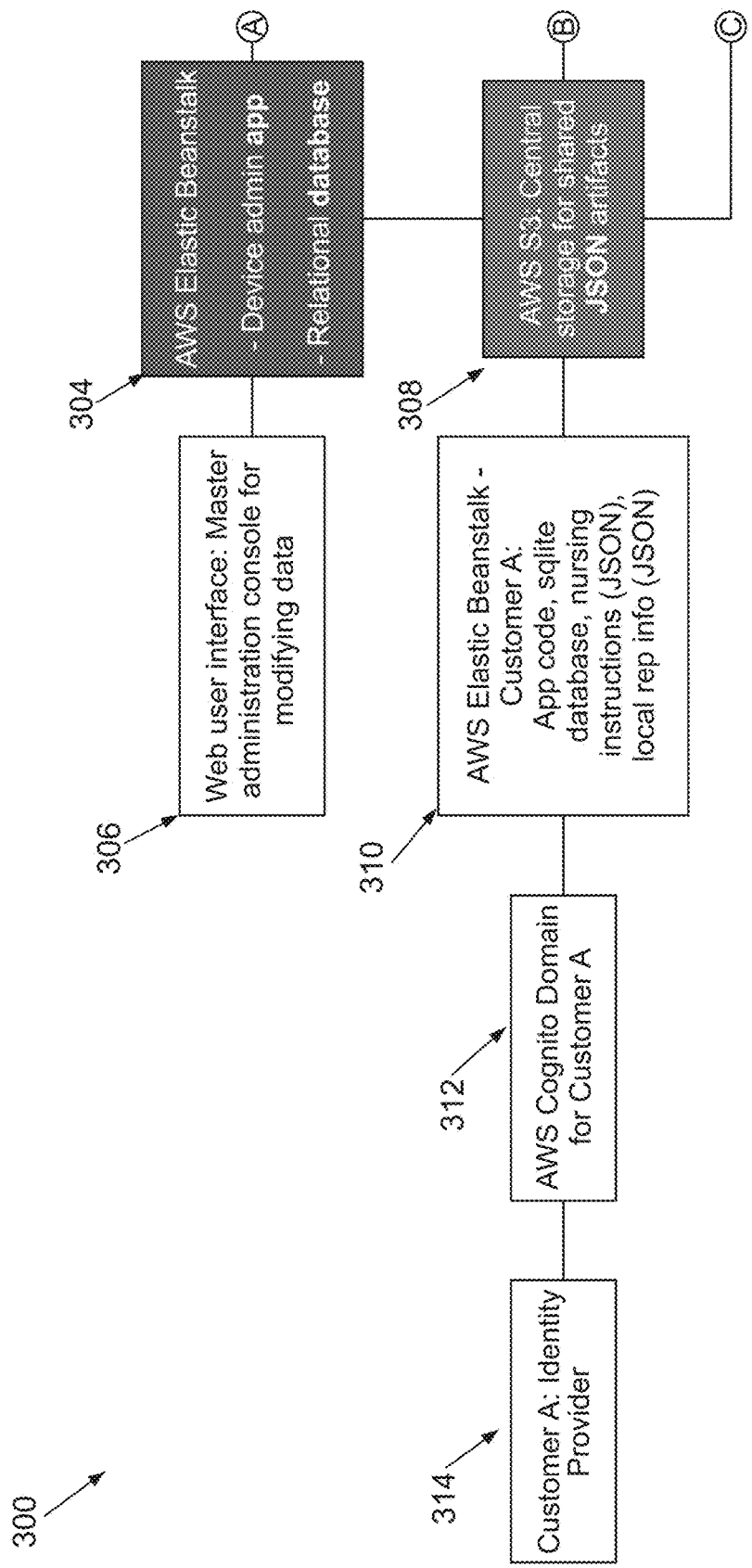
FIGS. 3A and 3B collectively show a diagram of an embodiment of a network architecture according to this disclosure.
Figure 3B:
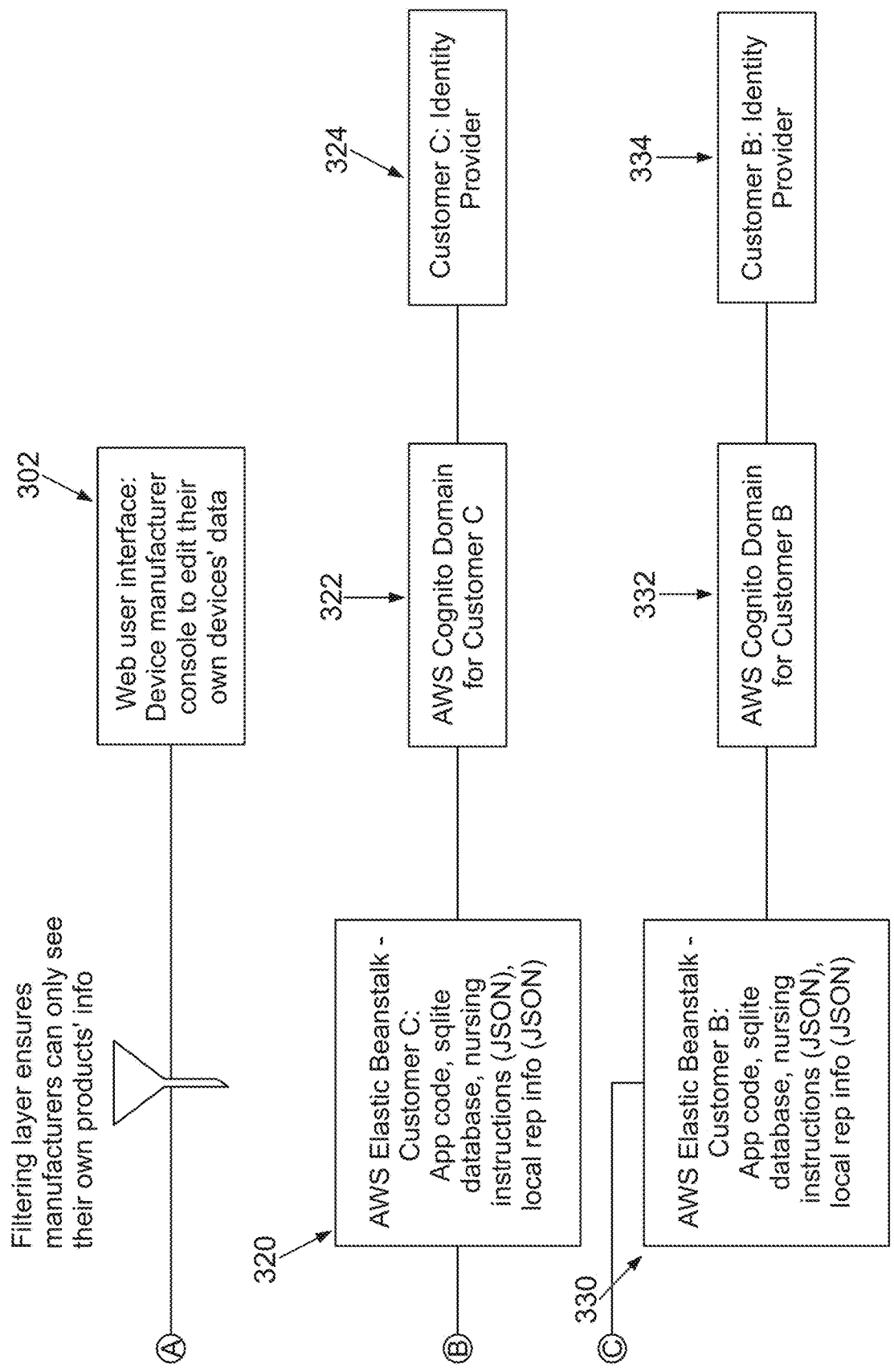

FIGS. 3A and 3B collectively show a hardware diagram of an embodiment of a network architecture according to this disclosure. In particular, there is a network architecture 300 that enables a cloud computing instance containing a first logical unit (e.g., a service provider), a second logical unit (e.g., a service consumer), a third logical unit (e.g., a service consumer), and a fourth logical unit (e.g., a service consumer). The first logical unit has a one-to-many correspondence with the second logical unit, the third logical unit, and the fourth logical unit. This is so because the first logical unit act as a data source for each of the second logic unit, the third logical unit, and the fourth logical unit, as further explained below. The second logical unit, the third logical unit, and the fourth logical unit are used by different medical practitioner organizations (e.g., hospital systems, surgery centers, etc.), to maximize compartmentalization therebetween, as different medical practitioner organizations may use different implantable medical devices or use same implantable medical devices differently (e.g., state rules, medical insurance, geography, local custom, language) or to protect competitive information (or patient information if present) or there may be different procedural instructions based on different medical practitioner organizations. Although there are three logical units depicted sourcing data from the first logical unit, this amount is not required and there can be less than three (one or two) or more than three logical units (e.g., four, five, six, seven, nine, ten, tens, hundreds, thousands), each logically similar, sourcing data from the first logical unit, as needed and as further explained below.

The first logical unit contains a first web interface 302, an orchestration service 304, a second web interface 306, and a central storage cloud 308. The second logical unit contains a medical case management cloud instance (MCMCI) 310, a first domain provider service 312, and a first authentication system 314. The third logical unit contains an MCMCI 320, a second domain provider service 322, and a second authentication system 324. The fourth logical unit contains an MCMCI 330, a third domain provider service 332, and a third authentication system 334.

The first web interface 302 is an executable logic (e.g., an application program, a script, an application programming interface) that may be executed on a user computing device (e.g., a computing terminal, a desktop computer). The user computing device may receive inputs from a user, such as by a user associated with an implantable medical device manufacturer (e.g., an employee, an agent). The user computing device receives user inputs from the user via a touchscreen, a mouse, a keyboard, a stylus, a microphone or other suitable user input device. The user computing device also includes network communication devices for transmitting and receiving information (e.g., IFUs). For example, the IFUs may include a set of nursing instructions. The user device includes network communication devices, such as a transceiver that communicates data and other types of content using a set of electromagnetic frequencies to communicate to a base station, a radio tower, or another transceiver in the network. In some embodiments, the network communication devices can include an ethernet adapter, a router, a signal repeater, or a network gateway. Examples of the information that is transmitted or received includes input received by the first web interface 302 as the first web interface 302 processes the user inputs into machine-readable values that represent various attributes of an implantable medical device or IFUs (e.g., nursing instructions). For example, the first web interface 302 processes the user inputs to detect that the user inputs relate to a particular implantable medical device, such as an implantable replacement heart, or an IFU therefor (e.g., nursing instructions). The first web interface 302 processes the user inputs to the user device to determine that the user inputs include a specification of the implantable medical device, which may include an IFU therefor. The specifications of the implantable medical device include but are not limited to: a device identifier unique to each device, a type identifier unique to each type of device, a manufacturer identifier unique to each manufacturing company, a hardware version identifier, a software (e.g., firmware, application software, system software, microcode, source code, object code) version identifier, a data file (e.g., a PDF file) containing an IFU (e.g., text, images, videos, barcodes leading to relevant content, nursing instructions). In some embodiments, the specifications may further include instructions on how to use or implant or remove or maintain the implantable device, such as medical or nursing techniques like monopolar cautery, bipolar cautery, diathermy, an inventory of required medical tools, a set of nursing instructions, and other specifications.

The first web interface 302 transfers the specifications of the implantable medical devices, which may include various IFUs, to the orchestration service 304 storing a set of records for various implantable medical devices, which may include various IFUs. For example, the first web interface 302 accesses the network communication devices of the user device. By accessing the network communication devices (e.g., a system call, an application programming interface), the first web interface 302 communicates with the orchestration service 304. In particular, the user profile associated with a representative of the implantable device manufacturer provides user inputs via the first web interface 302 to add specifications to the orchestration service 304 for a particular implantable medical device, which may include an IFU therefor. In some embodiments, a set of user profiles may have permissions to modify specifications in the orchestration service 304. Another set of user profiles may have permissions to remove specifications of implantable medical devices that are in the orchestration service 304.

The second web interface 306 may be an executable logic (e.g., an application program, a script, an application programming interface) executed on a network administration (e.g., a superuser profile) device, such as by a user that has a profile that is permissioned as a network administrator (e.g., a superuser), for the first logical unit and may include the second logical unit, the third logical unit, and the fourth logical unit. The network administration device (e.g., a computing terminal, a desktop computer) receives network administrator input from the user via a touchscreen, mouse, keyboard, stylus, microphone or other user input device. The network administration device also includes network communication devices for transmitting and receiving information from the second web interface 306. The network administration device includes network communication devices, such as a transceiver that communicates data and other types of content using a set of electromagnetic frequencies to communicate to a base station, a radio tower, or another transceiver in the network. In some embodiments, the network communication devices can include an ethernet adapter, a router, a signal repeater, or a network gateway. The second web interface 306 processes the user inputs into machine-readable values that represent any data to be added, modified, or removed from the orchestration service 304, central storage cloud instance 308, and the MCMCI 310, the MCMCI 320, and the MCMCI 330. The second web interface 306 communicates, using networking devices of the network administration device.

The orchestration service 304 (e.g., an AWS Elastic Beanstalk service) includes a device administration application program (e.g., a web application program) and a relational database with which the device administration application communicates (e.g., write, read, modify, delete, deduplicate, copy, retrieve). The device administration application program communicates with the first web user interface 302 and the second web user interface 306 to enable functionality as explained above. The database organizes data into a set of tables, although non-relational database can be used (e.g., a graph database, a NoSQL database). Each of these tables has a set of columns and rows, with a unique key (e.g., a primary key) identifying each row. In some examples, a row is called a record and can include any number of columns. Generally, each table/relation represents one conceptual entity, such as implantable device, patient, or medical facility. Each of the rows represent features of the entity and each of the columns represent values attributed to the entity (such as a type identifier unique to each type of device, a manufacturer identifier unique to each manufacturing company, or medical techniques. Each row in a table has its own unique key. A row in a first table can be linked to rows in a second table by adding a column for the unique key of the linked row. The database provides the capability to select or modify one and only one row in a table.

In some embodiments, the database includes a privacy protocol (e.g., a logical screen, a schema logic, a data filter, a user restriction) which limits (e.g., restricts) access to certain tables to a subset of users with specific permissions. For instance, users associated with a first implantable device manufacturer may be prohibited from accessing (e.g., reading) or modifying records for any devices associated with a second implantable device manufacturer and vice versa. Similarly, if present, the database restricts access to patient identifying data that includes any personally identifiable information (PII) and data protected by the Health Insurance Portability and Accountability Act of 1996 (HIPAA) or another similar law, unless permissioned medical practitioner user attempts to access same, as disclosed herein.

The central storage cloud 308 (e.g., an AWS S3 service) accesses the orchestration service 304 to store the contents of the database as artifacts, such as a JSON artifact, an extensible markup language (XML), a comma separated values (CSV), or another suitable data type. The central storage cloud 308 may be a cloud service that provides object storage through a web service interface disclosed herein. The central storage cloud 308 may have an object storage architecture that provides scalability, high availability, and low latency with high durability, with basic storage units being objects which are organized into conceptual buckets and each object is identified by a unique, user-assigned key. The central storage cloud instance 308 may update the set of objects periodically (e.g., several times daily, weekly) or by monitoring for changes, to ensure the most recent contents of the database in the orchestration service 304 are reflected in the set of objects. For example, such update can include (i) periodically copying certain records, subsets of records, certain tables, subsets of tables, or the database in its entirety, or (ii) determining that an update is needed (e.g., by periodically pinging or monitoring for changes), identifying differences (e.g., specific data files, attributes of data files, metadata of data files, versions of data files, size of data files, timestamp of data files) and downloading only those records, objects, or files, to minimize unnecessary computational cycles and networking bandwidth.

The central storage cloud 308 provides the set of objects to the MCMCI 310, MCMCI 320, and MCMCI 330, as further explained below. Each of the MCMCI 310, MCMCI 320, and MCMCI 330 are used by different medical practitioner organizations (e.g., hospital systems, surgery centers, etc.), to maximize compartmentalization, as different medical practitioner organizations may use different implantable medical devices or use same implantable medical devices differently (e.g., state rules, medical insurance, geography, local custom, language) or to protect competitive information (or patient information if present) or there may be different IFUs based on different medical practitioner organizations. The second interface 306 configures the central storage cloud 308 to be periodically replicated, whether partially (e.g., by differences of data files) or fully, for the MCMCI 310, the MCMCI 320, and the MCMCI 330 to be accessed by various different medical practitioner organizations such that the MCMCI 310, the MCMCI 320, and the MCMCI 330 are logically and informationally isolated or compartmentalized from each other, as different medical practitioner organizations may use different implantable medical devices or use same implantable medical devices differently (e.g., state rules, medical insurance, geography, local custom, language) or to protect competitive information (or patient information if present) or there may be different IFUs based on different medical practitioner organizations.

The second logical unit (service consumer), the third logical unit (service consumer), and the fourth logical unit (service consumer) may be logically dependent on or subservient to the first logical unit (service provider), as the first logical unit periodically sources relevant data (e.g., IFUs and contact information) to the second logical unit, the third logical unit, and the fourth logical unit. As such, each of the MCMCI 310, the MCMCI 320, and the MCMCI 330 respectfully contains an orchestration service, an application program, a database (e.g., a relational database, an embedded database, an in-memory database, a SQLite database), a set of instructions (e.g., IFUs in a serialized format like JSON or another) for an implantable medical device, as disclosed herein, and a set of contact information (e.g., a first name, a last name, a phone number, an email address in a serialized format like JSON or another) for a manufacturer representative assigned to that respective implantable medical device, as disclosed herein. The database may be embedded in the application program, which may improve speed of processing record queries, record retrieval and record service. Within the database, the set of instructions for the implantable device may be related with the set of contact information for the manufacturer representative by a pair of respective primary keys, as disclosed herein. Each of the MCMCI 310, MCMCI 320, and MCMCI 330 may be deployed as an on-premise cloud instance or an off-premise cloud instance. Therefore, the medical practitioner organizations respectively be provided with the first authentication system 314, the second authentication system 324, and the third authentication system 334. The first authentication system 314, the second authentication system 324, and the third authentication system 334 respectively limit access to copies of the central storage cloud 308 respectively stored in respective databases in the MCMCI 310, the MCMCI 320, and the MCMCI 330 and other networked devices to a user with a set of valid credentials and appropriate permissions. Each medical practitioner organization may also respectively be provided with the first domain provider service 312 (e.g., an AWS Cognito service), the second domain provider 322 service (e.g., an AWS Cognito service), and the third domain provider service 332 (e.g., an AWS Cognito service). The first domain provider 312, second domain provider 322, and third domain provider 332 manage local networking functions for each of the medical practitioner organizations, for user access and compartmentalization, as explained above.

Figure 4A:
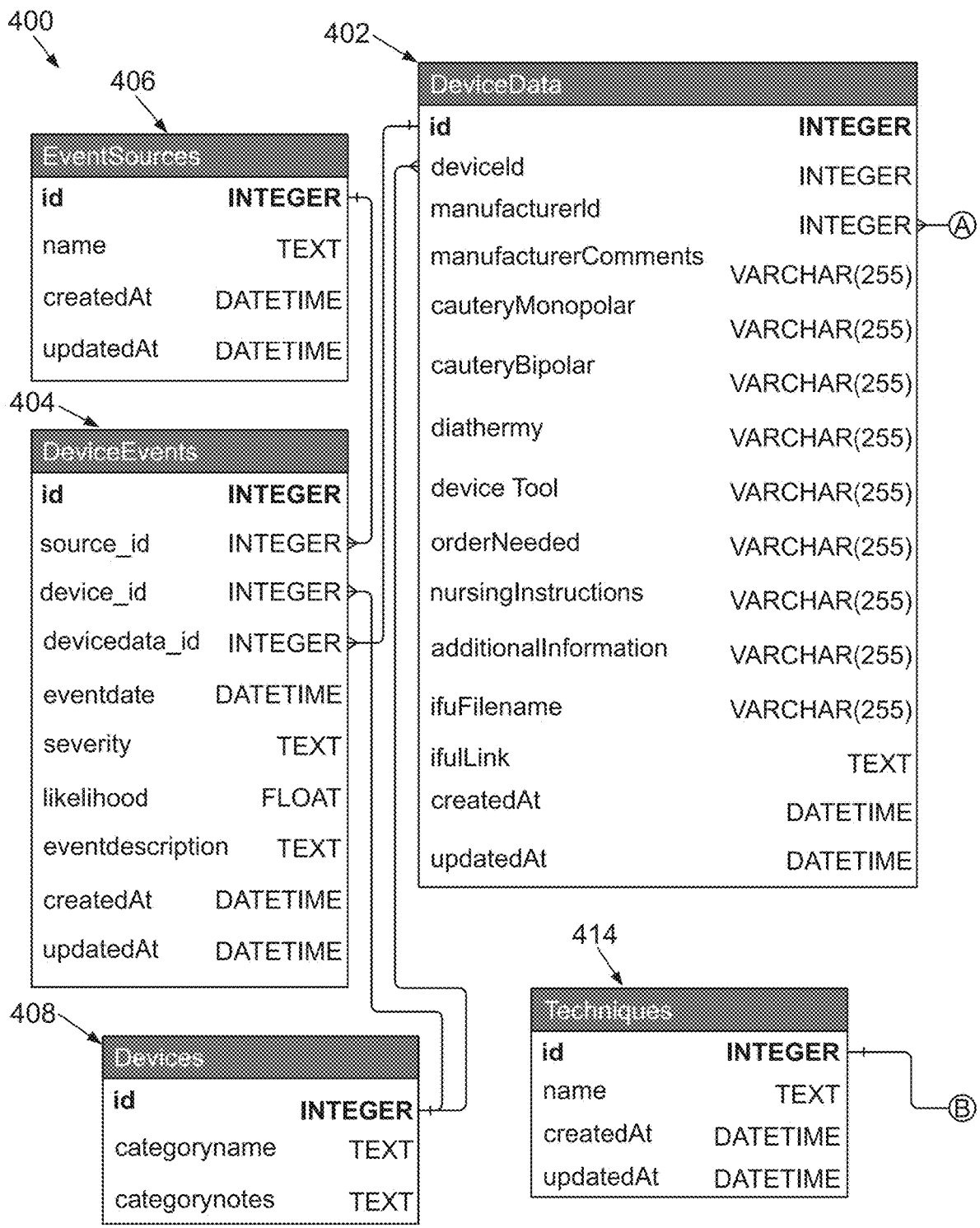
FIGS. 4A and 4B collectively show a diagram of an embodiment of a database schema according to this disclosure.
Figure 4B:
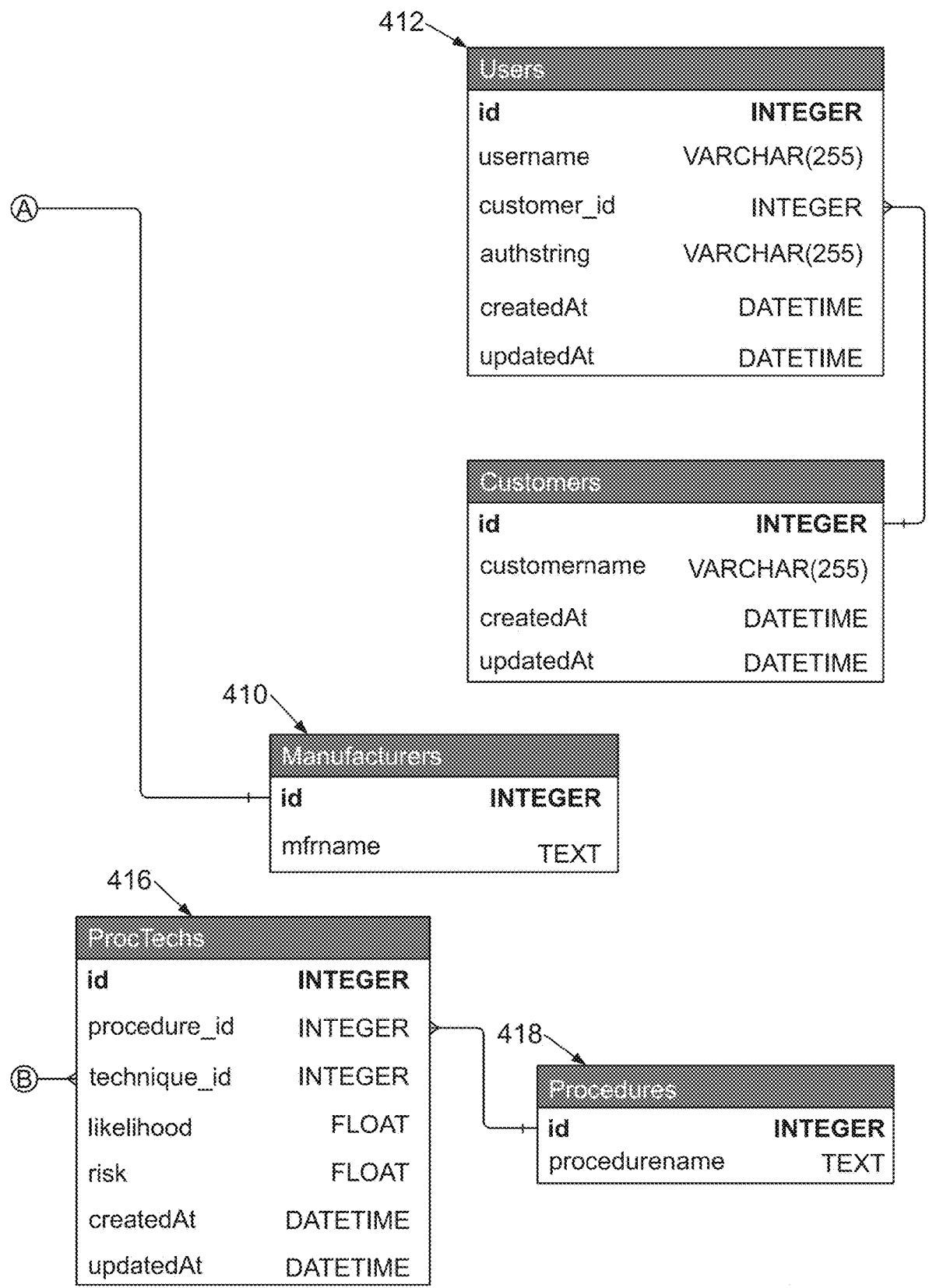

FIGS. 4A and 4B collectively show a diagram of an embodiment of a database schema according to this disclosure. In particular, there is a database schema 400 that may be implemented in the database within the orchestration service 304. The database schema 400 includes a set of tables 402, 404, 406, 408, 410, 412, 414, 416, and 418, collectively "tables 402 to 418." As described above, each of the tables 402 to 418 contains information associated with an entity (e.g., logical entity). For example, the table 420 includes information associated with implantable devices. The lines between the tables represent tabular data relationships within the database within the orchestration service 304, as related by primary keys (bolded font) in data types (capitalized font) in correspondences as indicated arrows (e.g., one-to-one, one-to-many, many-to-one, many-to-many). Note that some data (e.g., rows) in the set of tables 402 to 418 are restricted to authenticated users that also possess a particular permission, as disclosed herein. The data that is restricted includes protected data relating to a patient, proprietary data associated with an implantable device, or other data that is desirable to control access or use of. A permission may be a defined level of access (e.g., read-only, modify, delete, manage access of user profiles, etc.) for a specific user profile or group of user profiles.

Figure 5:
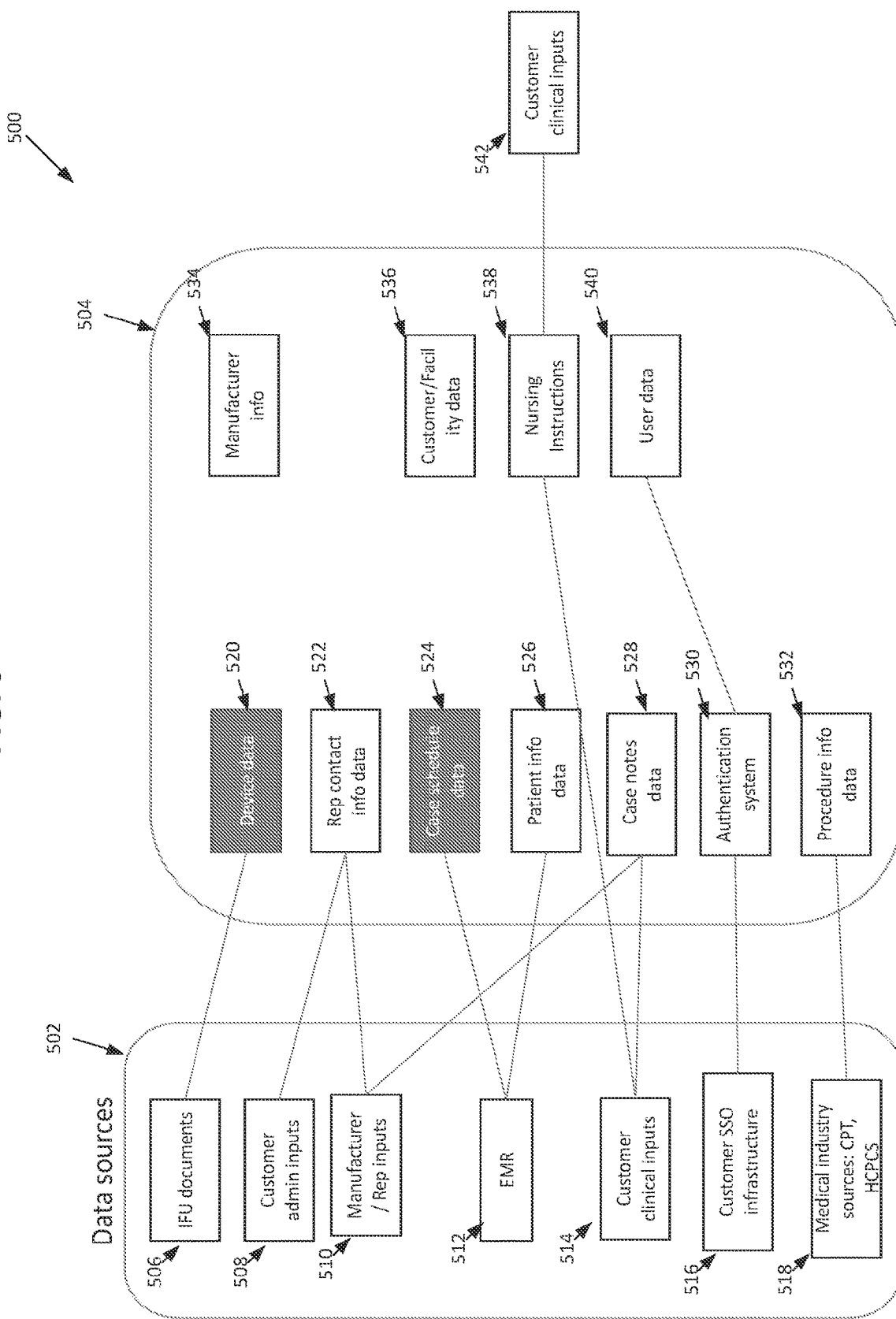
FIG. 5 shows a diagram of an embodiment of a case chat communicator according to this disclosure.
Figure 6A:
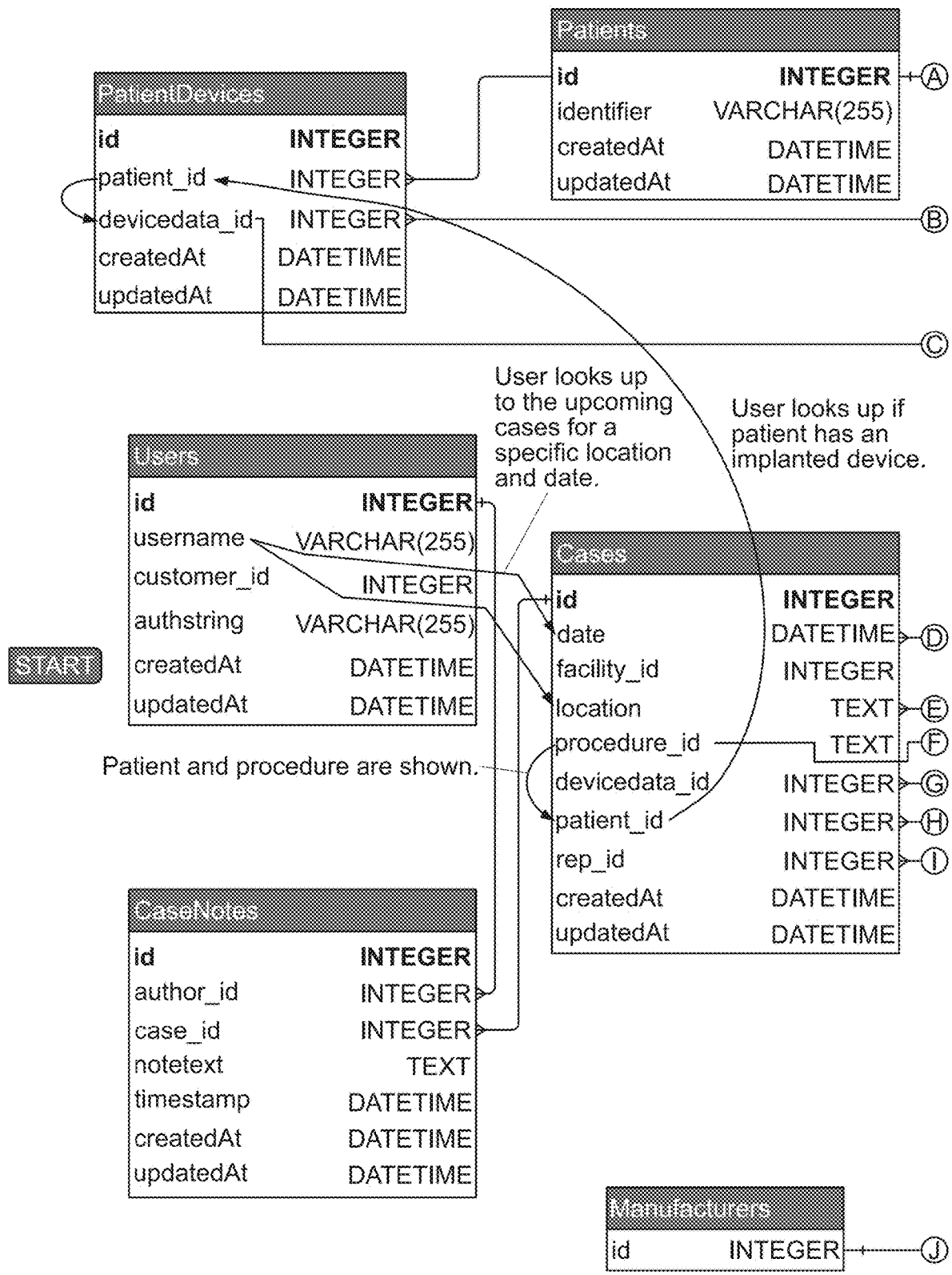
FIGS. 6A, 6B, 6C, and 6D collectively show a diagram of an embodiment of a software architecture for a database storing a set of data for a set of implantable medical devices according to this disclosure.
Figure 6B:
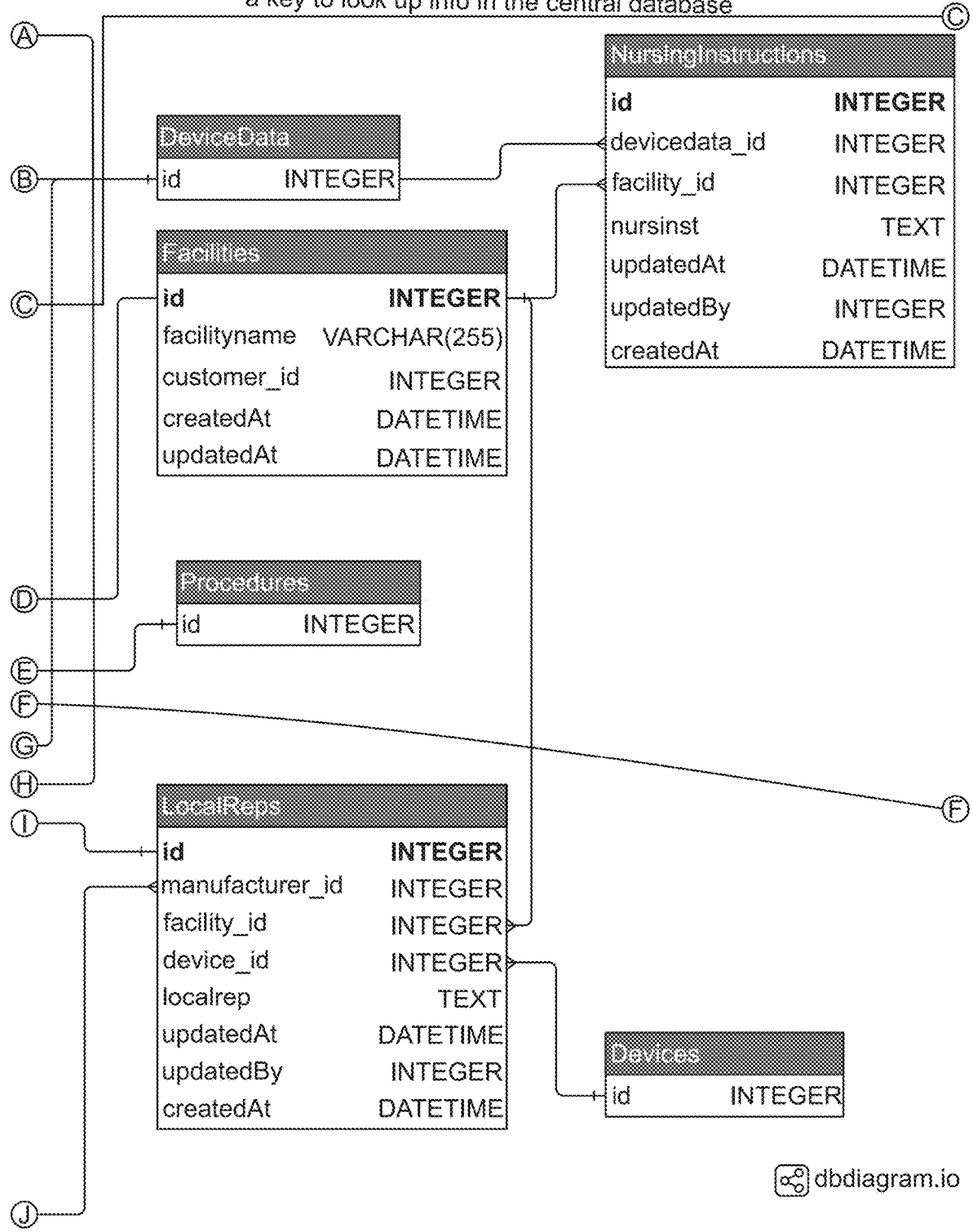
Figure 6D:
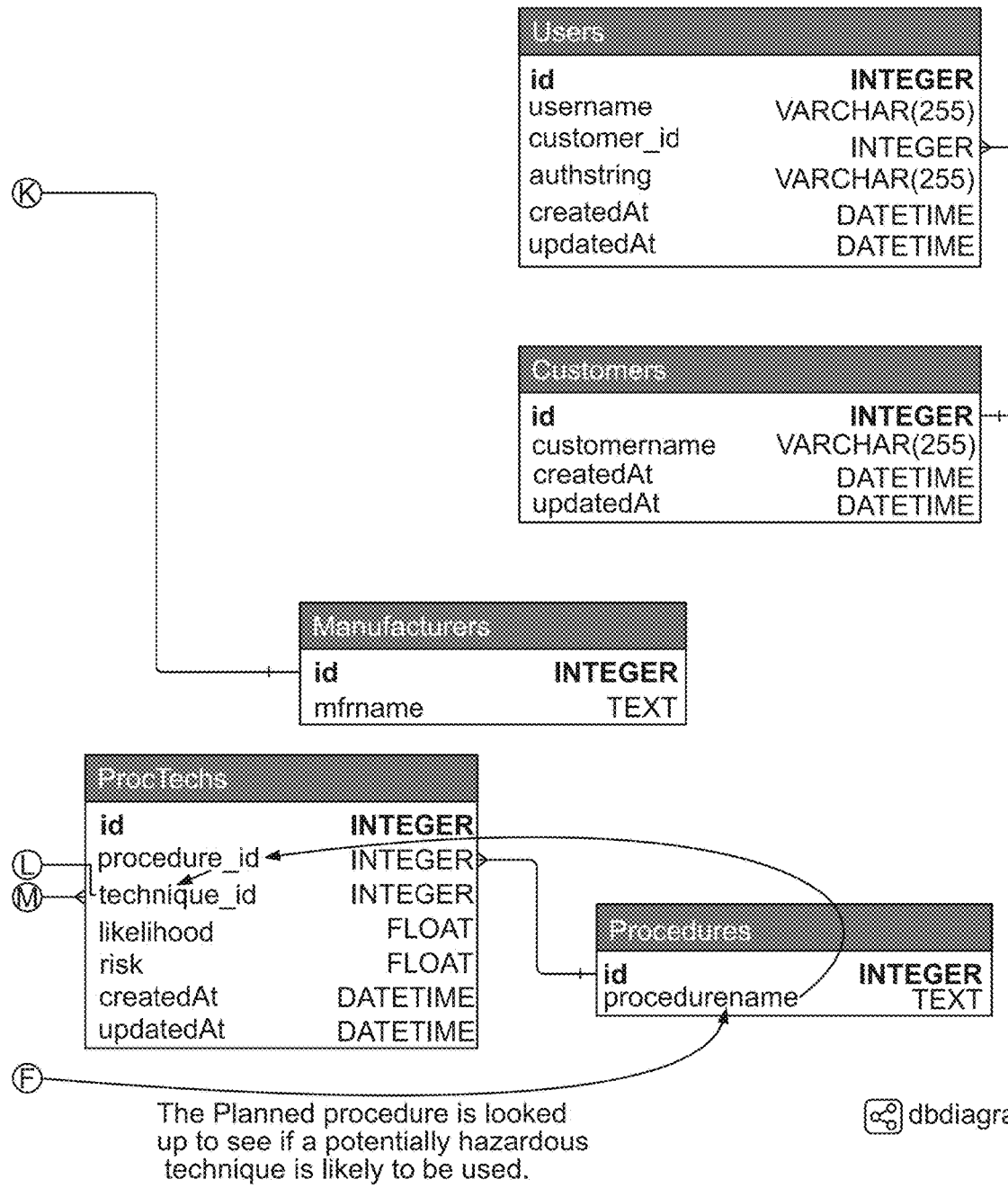
Figure 6C:
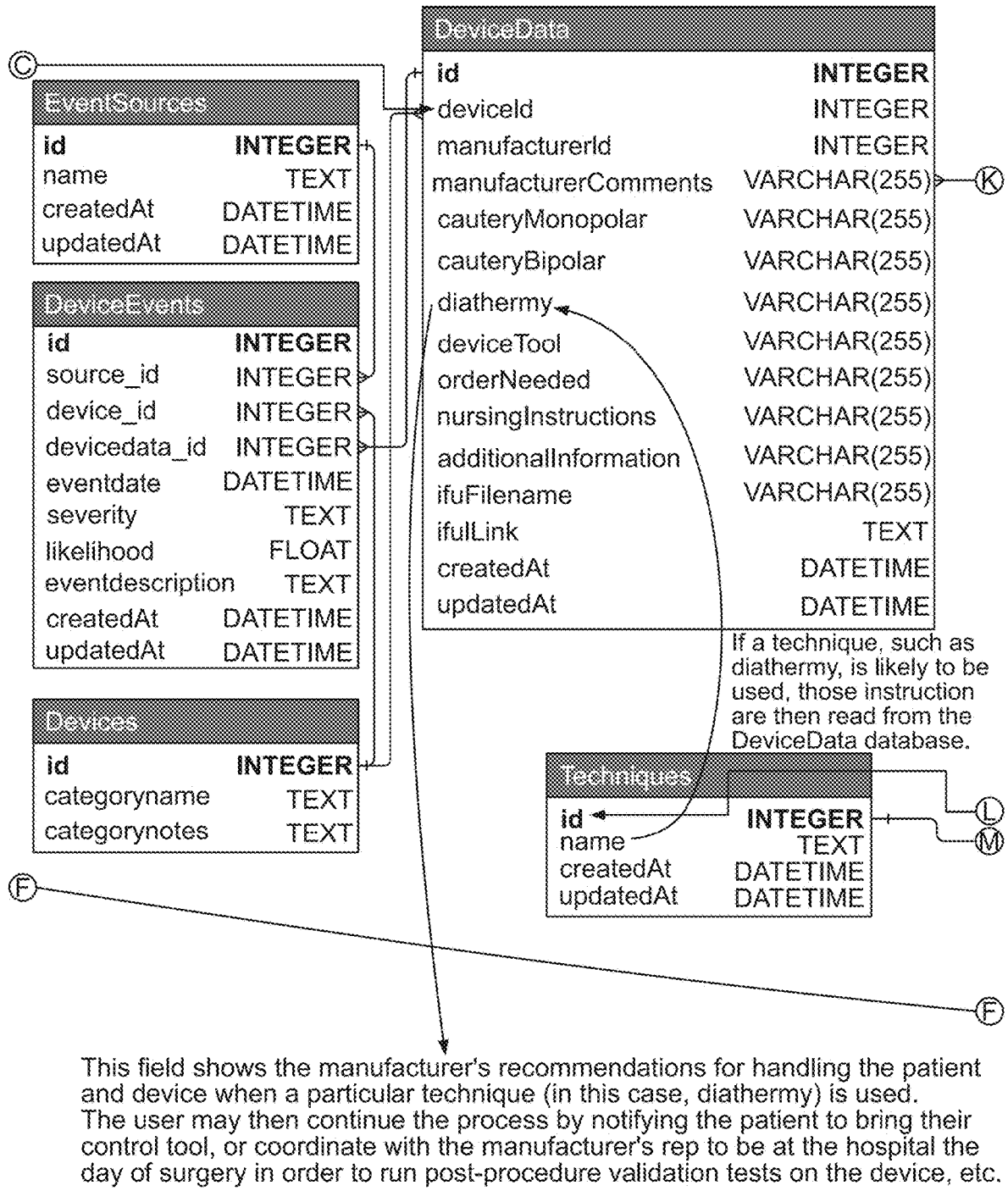

FIG. 5 shows a diagram of an embodiment of a case chat system according to this disclosure. In particular, there is a case chat system 500 that integrates all information relevant to a specific medical procedure case and facilitates secure and private messages related to that case such that patients (via user profiles), medical practitioners (via user profiles), and implantable device manufacturers (via user profiles) involved in that case can quickly and securely access that data (e.g., read, write, copy, modify, save, print, display) and post new messages related to the case, using a set of data sources 502 and a case chat communication system 504 (e.g., a chatbot application program), with data relationships depicted by lines. For example, the case chat system 500 may aggregate data and messages related to each specific medical procedure case, so that anyone (e.g., a doctor, a nurse, a representative of an implantable medical device manufacturer, a patient, an agent of a patient) involved in that case can timely and readily access relevant information for that case, as permissioned via authentication. For example, if a user (e.g., a doctor, a nurse, a representative of an implantable medical device manufacturer, a patient, an agent of a patient) operates a computing terminal, as disclosed herein, to access a case chat session for a medical procedure (e.g., a surgery) A scheduled for a patient A to occur next Wednesday at 3 pm ET in a facility A in room A, then the user may observe any relevant case notes that were input for that case from a preadmission team, a manufacturer representative, an anesthesiologist, or anyone else who posts a message regarding that case. As such, this enables an entire relevant team-from a preadmission phase to a pre-op phase on day of that procedure, to the anesthesiologist in room A, to a nurse in a post-surgical recovery area, to the manufacturer representative who needs to show up to reboot patient's A active implantable medical device (e.g., a pacemaker, a neurostimulator) after surgery—to be informationally synchronized and remain information synchronized before, during, or after this medical procedure. As such, the case chat communication system 504 can receive inputs 542 (e.g., medical practitioner users, implantable medical device users, patient users). By using the database schema 400 described above in FIGS. 4A and 4B and the network architecture of the hardware diagram 300, the case chat system 500 controls the flow of messages, such as patient data 526 that includes that personally identifiable information (PII) and EMR 512 that includes data protected by the Health Insurance Portability and Accountability Act of 1996 (HIPAA) or another similar law. The case chat system 500 is contained with the first logical unit (the orchestration service 304) and can be initially cloned, customized and applied to each of the second logical unit, the third logical unit, and the fourth logical unit, while compartmentalizing data and relationships, as disclosed herein, and then periodically updated, as disclosed herein.

The case chat communication system 504 may include an artificial intelligence (AI) system such as a software application program that includes or accesses a machine learning model (e.g., a deep learning model, a natural language processing (NLP) model). The case chat communication system 504 can be executed as a cloud instance or as a server based application within the first logical unit (the orchestration service 304) and initially cloned, customized, applied, and periodically updated, as disclosed herein. In some embodiments, the case chat communication system 504 is communicatively coupled to receive and deliver messages using a cellular messaging (e.g., SMS) or using an over the top communication protocol (e.g., iMessage, WhatsApp, etc.). The case chat communication system 504 may be coupled to a network by a transceiver. The case chat communication system 504 may be further coupled to a database, such as the database in the orchestration service 304 or the databases in the second logical unit, the third logical unit, or the fourth logical unit. The case chat communication system 504 can access the databases to search for information related to a message that is received from a computing device that is executing a session with an authenticated user profile.

The case chat system 500 implements a case chat communication system 504 to receive messages from user devices associated with user profiles that have permissions for different groups of users. For example, a first group of user profiles that are used by medical practitioners, a second group of user profiles used by patients, and a third group of user profiles used by representatives of an implantable device manufacturers, a fourth group of user profiles used by system administrators, compartmentalized, as disclosed herein. The case chat communication system 504 is communicatively connected to the set of data sources 502 and further connected to the second logical unit, the third logical unit, and the fourth logical unit.

For example, the case chat communication system 504 may receive a message from a medical practitioner (via a corresponding user profile), within a respective logical unit (second, third, or fourth), that is directed to a representative of the implantable device manufacturer (via a corresponding user profile). In response to receiving the message, the case chat communication system 504 accesses the set of data sources 502 and optionally processes the message based on the AI system and the set of data sources. For example, the case chat communication system 504 will normally refer to internal data (e.g., information sources 522-532), which was sourced from the set of data sources 502. For example, the case chat communication system 504 may receive a message and interact with the set of data sources 502 in real-time, as need based on content of that message, as disclosed herein. For example, when the case chat communication system 504 receives a message, the case chat communication system 504 may perform various lookup operations for relevant case information from information sources 522-532 (e.g., 524, 528, 526, 522, 520) as fed by the set of data sources 502. After accessing the set of data sources 502, the case chat communication system 504 can include information from a data source of the set of data sources and generate a final or ultimate message for delivery to the recipient, with additional content sourced by the AI system generated based on the data sources 502. The set of data sources 502 may include but is on limited to: the IFU 506 (e.g., cautery instructions), the customer admin inputs 508, the manufacturing company inputs 510, the EMR 512, the customer clinical inputs 514, the customer single sign-on infrastructure 516, and the medical industry data 518.

Using the AI system, the case chat communication system 504 may scan the message received for any information that includes data protected by the Health Insurance Portability and Accountability Act of 1996 (HIPAA) or another similar law. For example, the case chat communication system 504 may perform string searches, fuzzy matching, natural language processing (e.g., a trained machine learning model), or other combination of processes that detect protected data within the message as identified based on reading and analyzing a respective EMR 512. The case chat communication system 504 may apply a rule-based system based on a first user profile and a first permission level associated with a sender of the message and a second user profile and second permission level associated a recipient of the message to determine if removal of the protected data is necessary. Continuing with the example of the first user profile and the first permission level associated with the medical practitioner sending a message to the second user profile having the second permission level associated the representative of the implantable device manufacturer, the case chat communication system 504 (the AI system) will remove (e.g., delete) or hide protected data (patient identifying data) that the first user profile and the first permission level is authorized to read, however, the second user profile having the second permission level is not authorized to read. After removing or hiding the protected data and including any applicable data from the set of data sources 502, the case chat communication system 504 delivers the message to the second user profile having the second permission level that is associated with the representative of the implantable device manufacturer. Similarly, in response to receiving the message, the representative of the implantable device manufacturer may send a reply message to the medical practitioner. Accordingly, the case chat communication system 504 receives the reply message from the representative of the implantable device manufacturer and deliver the message to the medical practitioner while now presenting content that was removed or hidden to the second user profile having the second permission level that is associated with the representative of the implantable device manufacturer.

For example, the case chat communication system 504 may respectively receive a message from a patient, using a respective logical unit, that is directed to a medical practitioner. In response to receiving the message, the case chat communication system 504 accesses the set of data sources 502. After accessing the set of data sources 502, the case chat communication system 504 can include information from a data source of the set of data sources, as selected by the AI system, and generate a final message for delivery to the recipient. In this example, the message may relate to a medical procedure involving a particular implantable device. In response to receiving the message, the medical practitioner may send a reply message to the patient.

Using the AI system, the case chat communication system 504 may scan the reply message to the patient to determine if any proprietary or sensitive data relating to the implantable medical device specification are included. For example, the case chat communication system 504 may utilize the AI system perform string searches, fuzzy matching, natural language processing (e.g., a trained machine learning model), or other combination of processes that detect proprietary or sensitive data relating to the implantable device specification within the message, which may include or exclude IFU, depending on use case, as trained by the AI system. The case chat communication system 504 may apply a rule-based system based on the sender and intended recipient of the message to determine if removal or hiding of the proprietary or sensitive data is necessary. Continuing with the example of the medical practitioner sending a message to the patient, the case chat communication system removes or hides proprietary or sensitive data that the medical practitioner is authorized to read, however, the patient is not authorized to read.

The case chat communication system 504 may receive a message from a patient, using a respective logical unit, that is directed to a medical practitioner. In response to receiving the message, the case chat communication system 504 accesses the set of data sources 502. After accessing the set of data sources 502, the case chat communication system 504 can include information from a data source of the set of data sources 502 and generate a final message for delivery to the recipient. In this example, the message may relate to a medical procedure involving a particular implantable medical device. The case chat communication system 504 may include (e.g., insert) information relating to the implantable medical device prior to delivering the message to the medical practitioner, which may be sourced by the AI system. The information relating to the implantable medical device may include device data 520, contact information of the representative of the implantable device manufacturer 522, case schedule data 524 (e.g., a surgery schedule), patient data 526, case notes 528, nursing instructions 538, procedure data 532, and/or facility data 536. Some of this information may be unique to the medical facility of the medical provider.

The medical practitioner may need to query the representative of the implantable medical device manufacturer to respond to the message from the patient. In these cases, the medical practitioner can invite the representative of the implantable medical device manufacturer into a group communication (e.g., a group chat) that also includes the patient and the medical practitioner. To process this, the case chat communication system 504 may utilize the AI system to perform filtering of the protected (patient identifying) data of the patient (e.g., from the profile for the representative) based on the data sources 502 and proprietary information of the implantable device manufacturer (e.g., from the profile of the patient) based on the set of data sources 502, in real-time (or execution time). By applying the filtering, the case chat communication system 504 provides a secure and private messaging that includes the profiles of the medical practitioner, patient and the representative of the implantable medical device manufacturer, yet protects privacy of the patient from the representative of the implantable medical device manufacturer and proprietary information of the representative of the implantable medical device manufacturer from the patient.

In above examples, the medical practitioner, the representative of the implantable device manufacturer, or the patient may access the case chat communication system 504 using a profile assigned to each user. The case chat communication system 504 applies a set of permissions for each group of users (e.g., medical practitioners, patients, representatives). The user profiles access the case chat communication system 504 using computing terminals (e.g., desktop computers, laptop computers, smartphones, tablet computers, wearable computers), which may receive inputs from a message sender and deliver a message recipient, as disclosed herein. Note that there may be more than two computing terminals sending and receiving messages depending on the nature of the sender(s) or recipient(s), as disclosed herein. For example, there may be three or more computing terminals, whether senders or recipients, as disclosed herein. Each of these terminals may respectfully be running an OS and an application program (e.g., a web browser application program) on the OS operated by a user profile. The application program may respectfully have a navigation section (e.g., a set of navigation buttons, an address bar, an options menu, a tab section, a bookmark bar) and a viewport operative based on the navigation section, where the viewport is below or lateral to the navigation section. Note that the case chat system 502, within each respective logical unit, may enable multiple chat sessions, as disclosed herein, whether occurring in parallel or serially, with each chat session relating to a particular procedure and an associated implantable medical device for that entity. For example, for a medical practitioner user, there may be an application program (e.g., a web browser application program) having a user interface with a set of tabs for such chat sessions (one tab per chat session) per logical unit, each tab corresponding to a procedure identifier as sourced from the set of data sources 502 based on the database schema 400 in view of the network architecture 300.

FIGS. 6A, 6B, 6C, and 6D collectively show a diagram of an embodiment of a process of a medical practitioner query for a medical procedure involving an implantable medical device database according to this disclosure. In particular, a medical practitioner user requests information from the case chat communication system 504 relating to a medical procedure using an input date/time and a location (e.g., a medical facility). The case chat communication system 504 searches one or more tables of the database to return a medical procedure identifier (e.g., a primary key) associated with an implantable medical device identifier (e.g., a primary key) associated with the procedure at that location and date/time.

For example, the case chat communication system 504 receives the input date/time and the location identifier associated with the procedure identifier. The case chat communication system 540 searches a first table of the database to determine a relationship between the date and location with a medical procedure identifier and a patient identifier. The case chat communication system 504 uses the patient identifier to search for any implantable devices identifier associated with the patient identifier, by primary key If the patient identifier has an implantable device identifier associated with the patient identifier, by the primary key, then the case chat communication system 504 generates a notification to the patient user to bring any relevant medical tools associated (e.g., a control tool) to the medical facility on the date of the medical procedure.

Additionally, the case chat communication system 504 may search one or more tables for the procedure identifier for medical techniques identifiers associated with the procedure. In response to identifying medical technique identifiers having a logical relationship with the procedure identifier, the case chat communication system 504 identifies any manufacturer relevant instructions (e.g., IFUs with nursing instructions) related to the medical technique identifiers. The manufacturer instructions are returned as a result to the medical practitioner with a likelihood of the medical techniques being used for the procedure and a recommendation of whether the representative of the implantable device should be present at the medical facility on the date of the procedure.

Figure 7:
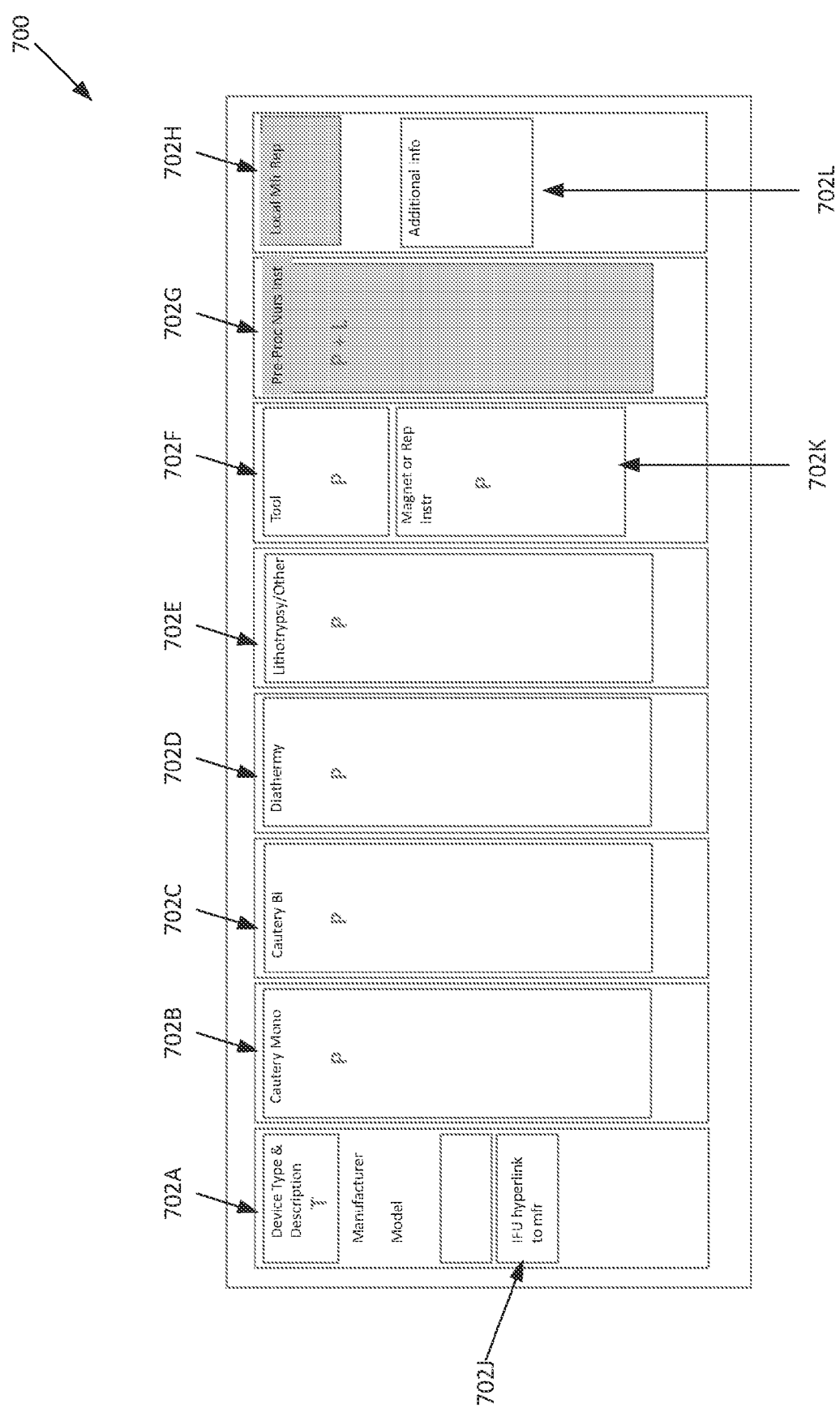
FIG. 7 shows a diagram of an embodiment of a graphical user interface presented by a screen according to this disclosure.

FIG. 7 shows a diagram of an embodiment of a graphical user interface presented by a screen according to this disclosure. In particular, a screen 700 includes a set of medical data 702A-702L, collectively "medical data 702." The screen 700 may be navigable to or from a chat screen, as disclosed herein. For example, the screen 700 and the chat screen can be immediate to each other.

To present the screen 700, a computing terminal (e.g., a desktop computer) may be running an operating system (OS) and an application program (e.g., a web browser application program) on the OS operated by a user profile through a person (e.g., a medical practitioner). The application program may have a navigation section (e.g., a set of navigation buttons, an address bar, an options menu, a tab section, a bookmark bar) and a viewport operative based on the navigation section, where the viewport is below or lateral to the navigation section. The computing instance may be a cloud computing instance scalably and fault-tolerantly enabling the application program to display medical data 702 in a manner that is suitable for a room (e.g., a procedure room, an operating room) during a medical procedure involving an implantable medical device. For example, the application program may define a set of regions (e.g., a tile, a pane) for each item of the medical data 702. In some embodiments, the set of regions have a predetermined width such that the medical data 702 is readily discernable and complete for what is needed or relevant to a medical practitioner for a medical procedure involving an implantable medica device, without requiring the medical practitioner to laterally scroll (along a horizontal plane) to see more, especially when maximized, which has been found to be technologically advantageous for medical practitioners at least while in immediate preparation for or during the medical procedure relative to an up-down scroll (along a vertical plane), such as when washing hands, putting on medical garments, talking to patient, performing the medical procedure, or other preparatory or medical procedural work. Each of the items in the set of medical data 702 is retrieved from the central storage cloud instance 308.

The screen 700 is associated with a user profile (e.g., a medical practitioner) related to a medical procedure being performed on a patient. The screen 700 presents an implantable medical device type identifier and a corresponding description 702A, instructions for specific medical techniques 702B to 702E, a list of tool identifiers used 702F, a set of nursing instructions 702G, a set of contact information 702H for the representative of the implantable medical device manufacturer, and a set of instructions 702K from the representative of the implantable device manufacturer. The screen 700 presents each item of the set of medical data 702 in a set of tiles or panes, but can have any suitable shape (e.g., a polygon, a square, a pentagon, a triangle, a circle, an oval). Each item can also have an individual tile or pane assigned such that each item of the set of medical data 702 is visually distinct (e.g., by background color, font color or size or format) relative to the other items of the set of medical data 702. The visual distinction may be annotated using a border line of any color or line type is possible (e.g., dashed, dotted). Each such tile or pane is less in perimeter or area than the viewport, subject to how the viewport is sized or shaped. Each of such tiles or panes is positionally fixed, but can be repositioned to optimize the legibility by the medical provider. Each of such tiles or panes is fixed in width but can be adjusted. Each of such tiles or panes is fixed in shape but can be adjusted. Note that if the viewport is user adjusted in size (e.g., maximized or not minimized but not maximized) while visible on that display, the screen 700 may correspondingly adjust in size. Since content of some tiles or panes may become correspondingly hidden or too small to be readily comprehended, the screen 700 may be programmed to prioritize display of some content or some tiles or panes over others, based on default criteria or user set criteria. If there are multiple tabs corresponding to multiple procedures, then such priority may be supplemented by nearest location and date/time of that display relative to the room where there medical procedure may be scheduled to take place.

Figure 8:
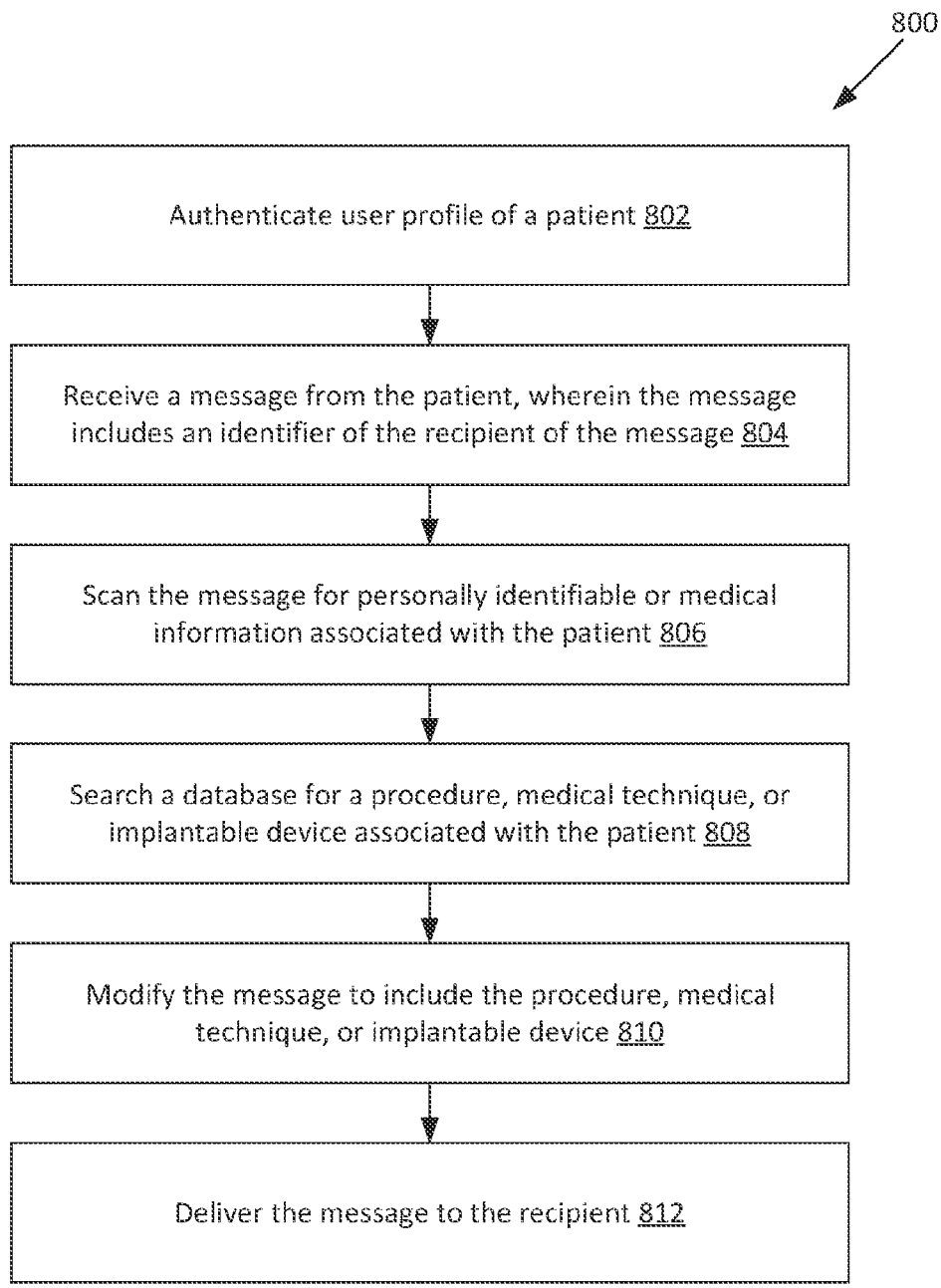
FIG. 8 shows a diagram of a flowchart illustrating a process of a patient sending a message using the case chat communication system according to this disclosure.

FIG. 8 shows a diagram of a flowchart illustrating a process of a patient user sending a message using the case chat communication system 504 according to this disclosure. As described above, at operation 802, the case chat communication system 504 authenticates a user profile associated with a patient. At operation 804, the case chat communication system 504 receives a message from the patient that is directed to a medical practitioner. At operation 806, the case chat communication system 504 scans the message, as described above, for any protected data to remove or hide from the message (and vice versa of presenting or not hiding is possible when appropriate). At operation 808, the case chat communication system 504 accesses a database or an object storage system, as appropriate. After accessing the set of data sources, at operation 810, the case chat communication system 504 can include information from a data source of the set of data sources and generate a final message for delivery to the recipient at operation 812. In this example, the message may relate to a medical procedure involving or affecting a particular implantable medical device.

Figure 9:
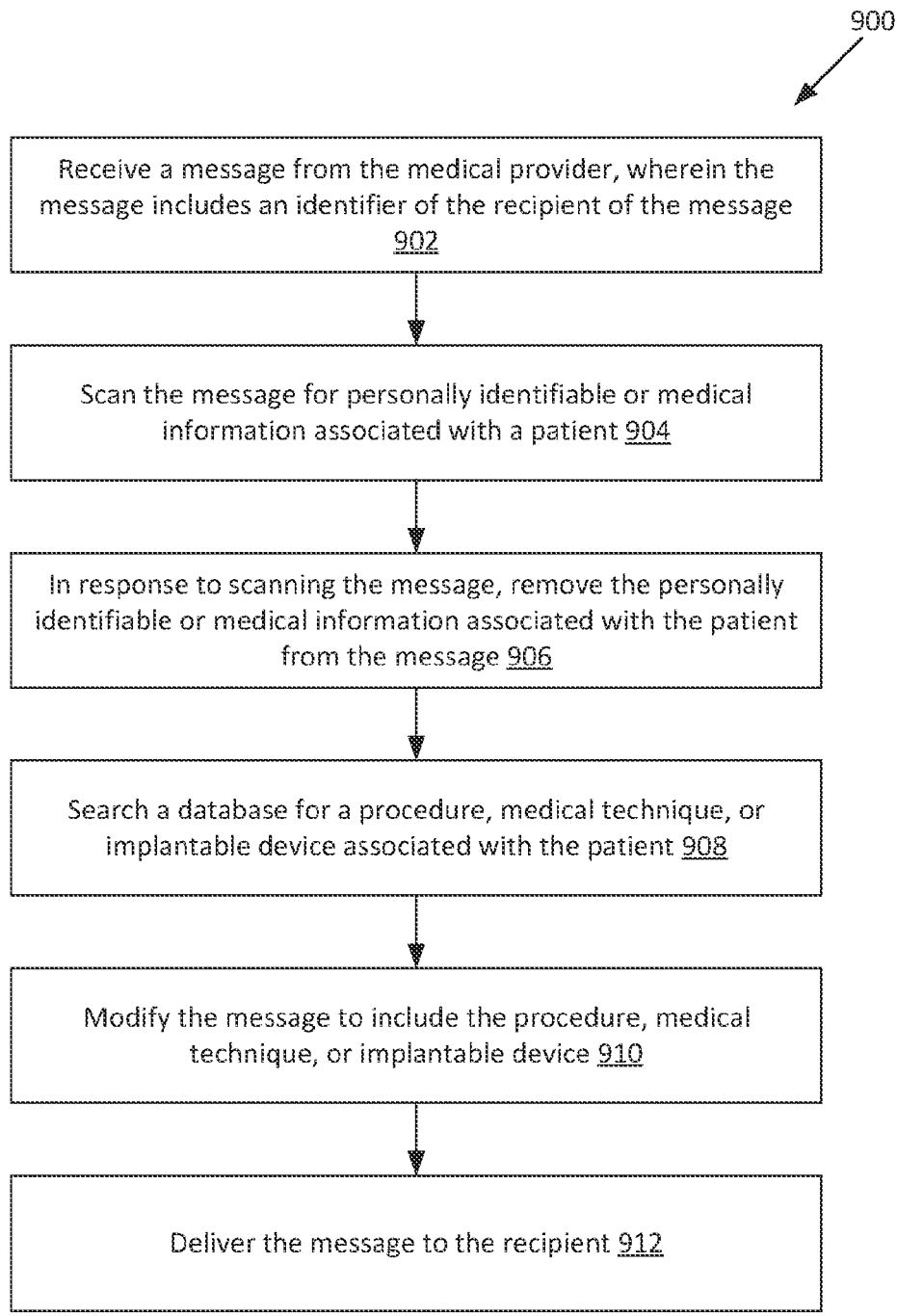
FIG. 9 shows a diagram of a flowchart illustrating a process of a medical practitioner sending a message using the case chat communication system according to this disclosure.

FIG. 9 shows a diagram of a flowchart illustrating a process of a medical practitioner user sending a message using the case chat communication system 504 according to this disclosure. As described above, at operation 902, the case chat communication system 504 receives a message from a medical practitioner user that is directed to a representative user of an implantable medical device manufacturer. At operation 904, the case chat communication system 504 may scan the message received for any information that includes data protected by HIPAA. At operation 906, the case chat communication system 504 may determine if removal or hiding of the protected data is necessary. If the recipient is a representative of the implantable medical device manufacturer, the case chat communication system 504 will remove or hide protected data that the medical practitioner is authorized to read, however, the representative of the implantable medical device manufacturer is not authorized to read. Alternatively, if the recipient is a patient user, the case chat communication system 504 will retain the protected data that the medical practitioner and the patient are authorized to read. In the example with the recipient being the representative of the implantable medical device manufacturer, after removing or hiding the protected data, at operation 908, the case chat communication system 504 can search the database for medical procedure identifiers, medical technique identifiers, or an implantable medical device associated with the message. At operation 910, the case chat communication system 504 may modify the message to include any applicable data from the set of data sources 502. After modifying the message, at operation 912 the case chat communication system 504 delivers the message to the representative of the implantable device manufacturer.

Figure 10:
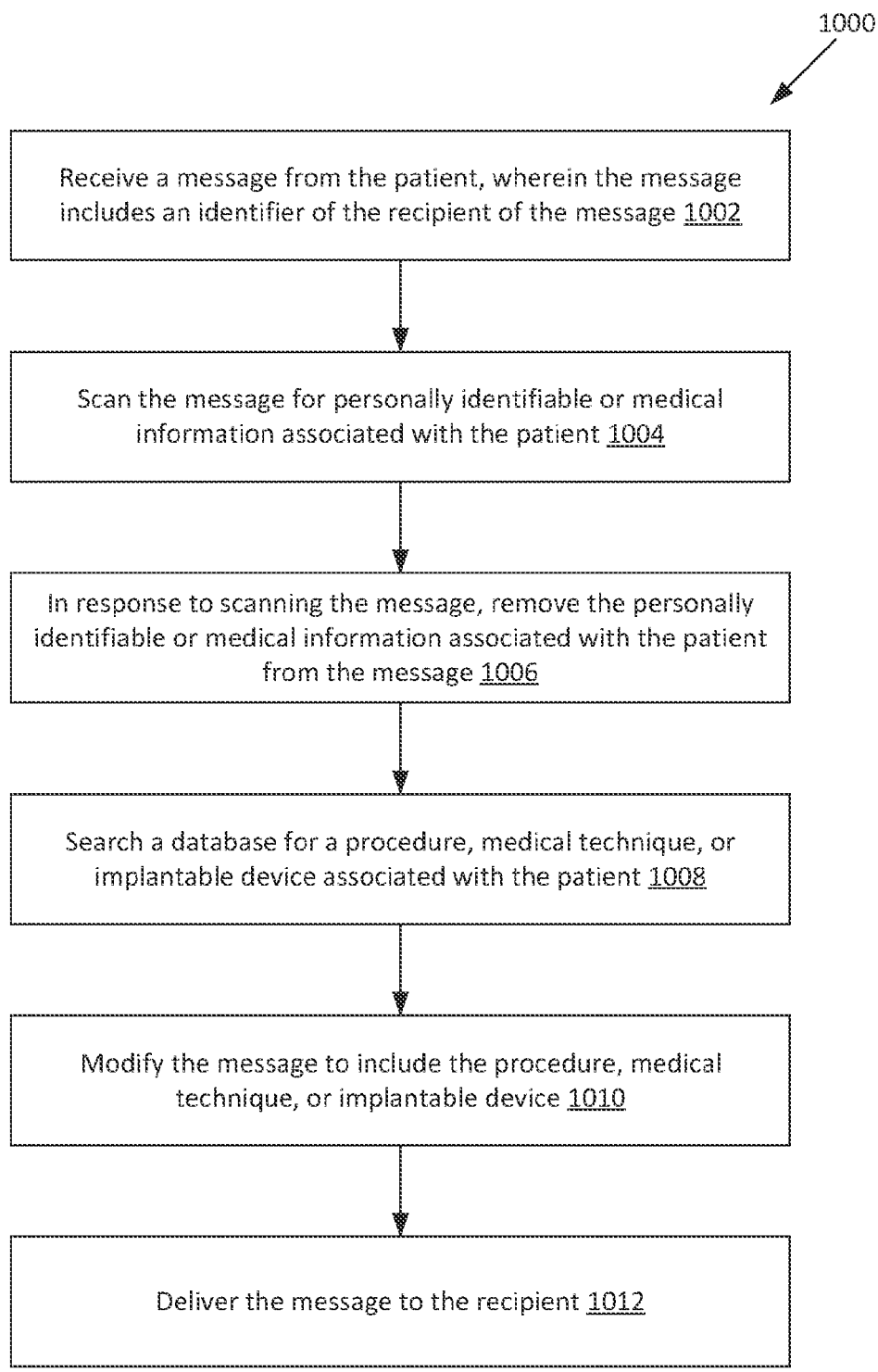
FIG. 10 shows a diagram of a flowchart illustrating a process of a representative of an implantable device manufacturer sending a message using the case chat communication system according to this disclosure.

FIG. 10 shows a diagram of a flowchart illustrating a process of a representative of an implantable medical device manufacturer sending a message using the case chat communication system according to this disclosure. As described above, at operation 1002, the case chat communication system 504 receives a message from a patient user that is directed to a medical practitioner. In response to receiving the message, at operation 1004, the case chat communication system 504 scans the message for personally identifiable information (PII) or medical information. After completing the scan, at operation 1006, the case chat communication system 504 removes or hides PII or medical information associated with the patient from the message. At operation 1006, the case chat communication system 504 accesses the set of data sources to include information from a data source of the set of data sources 502 and generate a final message for delivery to the recipient. At operation 1008, the case chat communication system 504 may search a database for a procedure identifier, medical technique identifier, or implantable medical device identifier associated with the patient. At operation 1010, the case chat communication system 504 may modify the message to include information relating to the implantable medical device prior to delivering the message to the medical provider. At operation 1012, the case chat communication system 504 delivers the message to the recipient, such as the medical practitioner. In this example, the medical provider may need to query the representative of the implantable medical device manufacturer to respond to the message from the patient. In these cases, the medical practitioner can invite the representative of the implantable medical device manufacturer into a group communication (e.g., a group chat) that also includes the patient profile and the medical provider profile. To process this, the case chat communication system 504 may perform filtering (remove or hide) of the protected data of the patient and proprietary information of the implantable device manufacturer in real-time (or execution time). By applying the filtering, the case chat communication system 504 provides a secure and private messaging that includes the medical provider, patient and the representative of the implantable device manufacturer.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution. Various I/O devices (e.g., keyboards, displays, pointing devices, DASD, tape, CDs, DVDs, thumb drives, memory media) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc . may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Various flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Although various embodiments have been depicted and described in detail herein, skilled artisans know that various modifications, additions, substitutions and the like can be made without departing from this disclosure. As such, these modifications, additions, substitutions and the like are considered to be within this disclosure.

What is claimed is:

1. A system, comprising:
   a server hosting a cloud computing instance containing:
      a first program;
      a first relational database managed by the first program, wherein the first relational database stores a set of data for an implantable medical device containing (i) an identifier of the implantable medical device, (ii) an instruction on use of the implantable medical device associated with the identifier, and (iii) a set of contact information for the implantable medical device associated with the identifier, wherein the first program is accessible by a manufacturer user profile from a manufacturer computing terminal;
      an object storage storing a set of artifacts sourced from the set of data for the implantable medical device containing (i) the identifier, (ii) the instruction on use of the implantable medical device associated with the identifier, and (iii) the set of contact information for the implantable medical device associated with the identifier; and a logical unit containing a second program and a second relational database managed by the second program, wherein the second relational database stores (i) a set of patient specific data for a medical procedure related to the identifier, (ii) a copy of the artifact of the set of artifacts containing the instruction on use of the implantable medical device associated with the identifier, and (iii) a copy of the artifact of the set of artifacts containing the set of contact information for the implantable medical device associated with the identifier, wherein the object storage is logically interposed between the first program and the second program, wherein the second program is accessible by a medical user profile from a medical computing terminal and a patient user profile from a patient computing terminal, wherein the patient user profile contains a set of personally identifiable information, wherein the second program is programmed to present a user interface to the medical user profile associated with the logical unit, wherein the user interface contains a first screen and a second screen, wherein the first screen contains a set of columns presented side-by-side distributively depicting a set of content populated from (i) the set of patient specific data for the medical procedure related to the identifier, (ii) the copy of the artifact of the set of artifacts containing the instruction on use of the implantable medical device associated with the identifier, and (iii) the copy of the artifact of the set of artifacts containing the set of contact information for the implantable medical device associated with the identifier, wherein (i) the copy of the artifact of the set of artifacts containing the instruction on use of the implantable medical device associated with the identifier and (ii) the copy of the artifact of the set of artifacts containing the set of contact information for the implantable medical device associated with the identifier are editable from the medical user profile, wherein the second screen presents a chat area for entry of a chat text associated with (i) the identifier, (ii) the set of patient specific data for the medical procedure related to the identifier, (iii) the copy of the artifact of the set of artifacts containing the instruction on use of the implantable medical device associated with the identifier, and (iv) the copy of the artifact of the set of artifacts containing the set of contact information for the implantable medical device associated with the identifier, wherein the first screen is navigable to the second screen or vice versa, wherein the chat text is presented to the manufacturer user profile, the medical user profile, or the patient user profile such that the manufacturer user profile does not access the set of personally identifiable information.

2. The system of claim 1, wherein the manufacturer user profile contains a set of proprietary information, wherein the chat text is presented to the manufacturer user profile, the medical user profile, or the patient user profile such that the patient user profile does not access the set of proprietary information.

3. The system of claim 1, wherein the second relational database is periodically updated off the first relational database to store the copy of the artifact of the set of artifacts containing the instruction on use of the implantable medical device associated with the identifier and the copy of the artifact of the set of artifacts containing the set of contact information for the implantable medical device associated with the identifier.

4. The system of claim 3, wherein the second relational database is periodically updated off the first relational database by differencing.

5. The system of claim 1, wherein the first program and the first relational database are permissioned not to be accessed by the medical user profile.

6. The system of claim 1, wherein the first program and the first relational database are permissioned not to be accessed by the patient user profile.

7. The system of claim 1, wherein the first program and the first relational database are permissioned not to be accessed by the medical user profile and the patient user profile.

8. The system of claim 1, wherein the instruction on use of the implantable medical device associated with the identifier is expressed in a data interchange format containing an attribute-value pair.

9. The system of claim 1, wherein the set of contact information for the implantable medical device associated with the identifier is expressed in a data interchange format containing an attribute-value pair.

10. The system of claim 1, wherein the instruction on use of the implantable medical device associated with the identifier is expressed in a first data interchange format containing a first attribute-value pair, wherein the set of contact information for the implantable medical device associated with the identifier is expressed in a second data interchange format containing a second attribute-value pair.

11. The system of claim 10, wherein the object storage stores an object containing the first attribute-value pair and the second attribute-value pair.

12. The system of claim 1, wherein the second program has the second relational database embedded therein.

13. The system of claim 1, wherein the second relational database is an in-memory database.

14. The system of claim 1, wherein the object storage has a one-to-many correspondence to the logical unit.

15. The system of claim 1, wherein the first screen is programmed to be presentable in a viewport such that the first screen prioritizes which of the set of content should remain presented when the viewport is adjusted in size.

16. The system of claim 15, wherein the first screen prioritizes based on a default criterion.

17. The system of claim 15, wherein the first screen prioritizes based on a user set criterion.

18. The system of claim 15, wherein the first screen prioritizes based on a location identifier, a date identifier, or a time identifier associated with the set of patient specific data for the medical procedure related to the identifier.

19. The system of claim 1, wherein the first screen is programmed to avoid lateral scrolling when maximized.

20. The system of claim 1, wherein the first screen and the second screen are immediate to each other.

* * * * *